United States Patent
Mestha et al.

(10) Patent No.: US 10,728,282 B2
(45) Date of Patent: Jul. 28, 2020

(54) DYNAMIC CONCURRENT LEARNING METHOD TO NEUTRALIZE CYBER ATTACKS AND FAULTS FOR INDUSTRIAL ASSET MONITORING NODES

(71) Applicant: General Electric Company, Schenectady, NY (US)

(72) Inventors: Lalit Keshav Mestha, North Colonie, NY (US); Olugbenga Anubi, Niskayuna, NY (US); Hema Achanta, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 246 days.

(21) Appl. No.: 15/986,996

(22) Filed: May 23, 2018

(65) Prior Publication Data

US 2019/0230119 A1   Jul. 25, 2019

Related U.S. Application Data

(60) Provisional application No. 62/619,377, filed on Jan. 19, 2018.

(51) Int. Cl.
*H04L 29/06* (2006.01)
*G06N 20/00* (2019.01)
(Continued)

(52) U.S. Cl.
CPC ...... *H04L 63/1466* (2013.01); *G05B 23/0297* (2013.01); *G06N 20/00* (2019.01);
(Continued)

(58) Field of Classification Search
CPC .................. H04L 63/1466; H04L 63/1416
(Continued)

(56) References Cited

U.S. PATENT DOCUMENTS

2013/0132149 A1   5/2013 Wei et al.
2013/0312092 A1*  11/2013 Parker ................ H04L 63/1408
                                                              726/22
(Continued)

FOREIGN PATENT DOCUMENTS

WO   01/048571 A1    7/2001
WO   2016139097 A1   9/2016

OTHER PUBLICATIONS

"Communication—European Search Report" for European Application No. 18204049.3 dated Apr. 18, 2019, 9 pp.
(Continued)

*Primary Examiner* — Longbit Chai
(74) *Attorney, Agent, or Firm* — Buckley, Maschoff & Talwalkar LLC

(57) ABSTRACT

Input signals may be received from monitoring nodes of the industrial asset, each input signal comprising time series data representing current operation. A neutralization engine may transform the input signals into feature vectors in feature space, each feature vector being associated with one of a plurality of overlapping batches of received input signals. A dynamic decision boundary may be generated based on the set of feature vectors, and an abnormal state of the asset may be detected based on the set of feature vectors and a predetermined static decision boundary. An estimated neutralized value for each abnormal feature value may be calculated based on the dynamic decision boundary and the static decision boundary such that a future set of feature vectors will be moved with respect to the static decision boundary. An inverse transform of each estimated neutralized value may be performed to generate neutralized signals comprising time series data that are output.

20 Claims, 18 Drawing Sheets

(51) Int. Cl.
*G05B 23/02* (2006.01)
*G06F 21/50* (2013.01)

(52) U.S. Cl.
CPC .......... *H04L 63/14* (2013.01); *H04L 63/1416* (2013.01); *G06F 21/50* (2013.01)

(58) Field of Classification Search
USPC .......................................................... 726/23
See application file for complete search history.

(56) References Cited

U.S. PATENT DOCUMENTS

| | | |
|---|---|---|
| 2017/0126712 A1 | 5/2017 | Crabtree et al. |
| 2017/0171243 A1 | 6/2017 | Ogawa et al. |
| 2017/0237752 A1 | 8/2017 | Ganguly et al. |
| 2017/0310690 A1 | 10/2017 | Mestha et al. |
| 2017/0359366 A1 | 12/2017 | Bushey et al. |

OTHER PUBLICATIONS

Allen, Ross E et al., "A Machine Learning Approach for Real-Time Reachability Analysis", 2014 IEEE/RSJ International Conference on Intelligent Robots and Systems, Chicago, 2014, (pp. 2202-2208, 7 total pages).

Khorrami, Farshad et al., "Cybersecurity for Control Systems: A Process-Aware Perspective", IEEE Design & Test, vol. 33, Issue: 5, Jul. 27, 2016, DOI: 10.1109/MDAT.2016.2594178, (pp. 75-83, 9 total pages).

Allan, Cook et al., "Measuring the Risk of Cyber Attack in Industrial Control Systems", Proceedings of the 4th International Symposium for ICS & SCADA Cyber Security Research (ICS-CSR 2016), Belfast, Aug. 23-25, 2016, DOI: http://dx.doi.org/10.14236/ewic/ICS2016.12, (pp. 103-113, 11 total pages).

Mestha, Lalit K. et al., "Cyber-attack detection and accommodation algorithm for energy delivery systems", 2017 IEEE Conference on Control Technology and Applications (CCTA), Mauna Lani, Aug. 27-30, 2017, (pp. 1326-1331, 6 total pages).

\* cited by examiner

DYNAMIC CONCURRENT LEARNING METHOD TO NEUTRALIZE CYBER ATTACKS AND FAULTS FOR INDUSTRIAL ASSET MONITORING NODES

CROSS-REFERENCE TO RELATED APPLICATION

The present application claims the benefit of U.S. Provisional Patent Application No. 62/619,377 entitled "DYNAMIC CONCURRENT LEARNING METHOD TO NEUTRALIZE CYBER ATTACKS/FAULTS IN MONITORING NODES" and filed Jan. 19, 2018. The entire contents of that application are incorporated herein by reference.

At least one embodiment described herein was made with Government support under contract number DE-OE0000833 awarded by the Department of Energy. The Government has certain rights in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to protect an asset when a monitoring node is experiencing a fault (as opposed to a malicious attack). Existing approaches to protect an industrial control system, such as failure and diagnostics technologies, may not adequately address these problems—especially when multiple, simultaneous attacks and/faults occur since such multiple faults/failure diagnostic technologies are not designed for detecting stealthy attacks in an automatic manner. It would therefore be desirable to protect an industrial asset from cyber-attacks/faults in an automatic and accurate manner even when attacks percolate through the IT and OT layers and directly harm control systems.

SUMMARY

According to some embodiments, input signals may be received from monitoring nodes of the industrial asset, each input signal comprising time series data representing current operation. A neutralization engine may transform the input signals into feature vectors in feature space, each feature vector being associated with one of a plurality of overlapping batches of received input signals. A dynamic decision boundary may be generated based on the set of feature vectors, and an abnormal state of the asset may be detected based on the set of feature vectors and a predetermined static decision boundary. An estimated neutralized value for each abnormal feature value may be calculated based on the dynamic decision boundary and the static decision boundary such that a future set of feature vectors will be moved with respect to the static decision boundary. An inverse transform of each estimated neutralized value may be performed to generate neutralized signals comprising time series data that are output.

Some embodiments comprise: means for receiving input signals from monitoring nodes of the industrial asset, each input signal comprising time series data representing current operation of the industrial asset; means for transforming, by a neutralization engine computer processor, the input signals into a set feature vectors in a feature space, each feature vector being associated with one of a plurality of overlapping batches of received input signals; means for automatically and dynamically generating a dynamic decision boundary based on the set of feature vectors; means for detecting an abnormal state of the industrial asset based on the set of feature vectors and a predetermined static decision boundary associated with the industrial asset; means for calculating an estimated neutralized value for each abnormal feature value based on the dynamic decision boundary and the static decision boundary such that a future set of feature vectors will be moved with respect to the static decision boundary; means for performing an inverse transform of each estimated neutralized value to generate neutralized signals comprising time series data; and means for outputting the neutralized signals.

Some technical advantages of some embodiments disclosed herein are improved systems and methods to protect an industrial asset from cyber-attacks/faults in an automatic and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
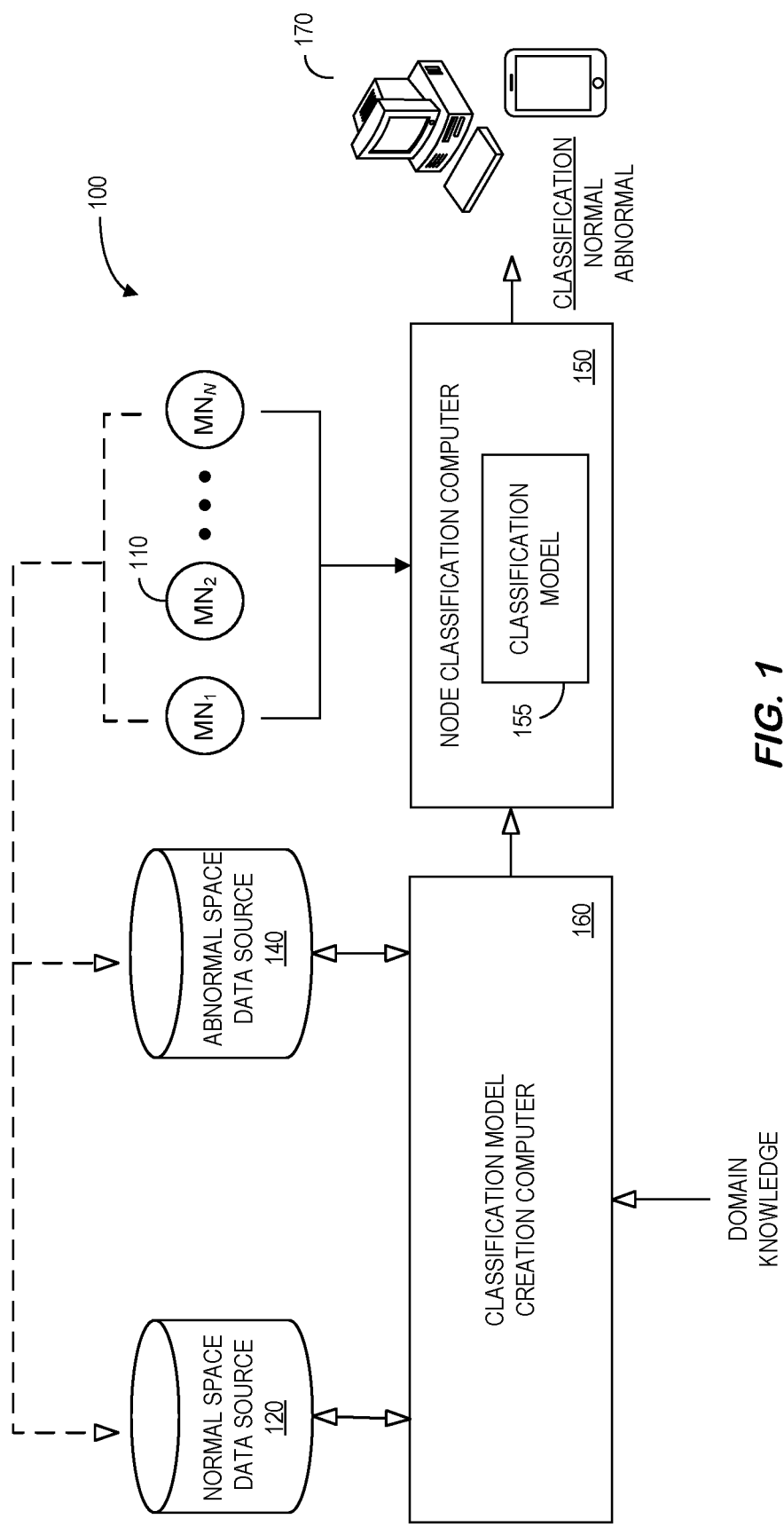
FIG. 1 is a high-level block diagram of a system that may be provided in accordance with some embodiments.

Industrial Control Systems ("ICS") that operate physical systems are increasingly connected to the Internet. Note that, as used herein, the term "industrial" might be associated with any system that is connected to an external source, such as the Internet in the case of a cyber-physical system or locally operating an air-gapped physical system. As a result, these control systems have been increasingly vulnerable to threats and, in some cases, multiple attacks may occur simultaneously. Protecting an asset may depend on detecting such attacks as well as naturally occurring faults and failures. Existing approaches to protect an industrial control system, such as failure and diagnostics technologies, may not adequately address these threats—especially when multiple, simultaneous attacks occur. It would therefore be desirable to protect an industrial asset from cyber threats and faults in an automatic and accurate manner. FIG. 1 is a high-level architecture of a system 100 in accordance with some embodiments. The system 100 may include a "normal space" data source 120 and an "abnormal space" data source 140. The normal space data source 120 might store, for each of a plurality of monitoring nodes 110, a series of normal values over time that represent normal operation of an industrial asset (e.g., generated by a model or collected from actual monitoring node 110 data as illustrated by the dashed line in FIG. 1). The abnormal space data source 140 might store, for each of the monitoring nodes 110, a series of abnormal values that represent abnormal operation of the industrial asset (e.g., when the system is experiencing a fault or cyber-attack).

Information from the normal space data source 120 and the abnormal space data source 140 may be provided to a classification model creation computer 160 that uses this data to create a static decision boundary (that is, a boundary that separates normal behavior and abnormal behavior). The static decision boundary may then be used by a node classification computer 150 executing a classification model 155. The classification model 155 may, for example, monitor streams of data from the monitoring nodes 110 comprising data from sensor nodes, actuator nodes, and/or any other critical monitoring nodes (e.g., monitoring nodes $MN_1$ through $MN_N$) and automatically output a classification result (e.g., indicating that operation of the industrial asset is normal or abnormal) to one or more remote monitoring devices 170 when appropriate (e.g., for display to a user) and/or to a disambiguation engine as described herein. As used herein, the term "automatically" may refer to, for example, actions that can be performed with little or no human intervention. According to some embodiments, information about detected abnormality may be transmitted back to an industrial control system.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The classification model creation computer 160 may store information into and/or retrieve information from various data stores, such as the normal space data source 120 and/or the abnormal space data source 140. The various data sources may be locally stored or reside remote from the classification model creation computer 160. Although a single classification model creation computer 160 is shown in FIG. 1, any number of such devices may be included. Moreover, various devices described herein might be combined according to embodiments of the present invention. For example, in some embodiments, the classification model creation computer 160 and one or more data sources 120, 140 might comprise a single apparatus. The classification model creation computer 160 and or node classification computer 150 functions may be performed by a constellation of networked apparatuses, in a distributed processing or cloud-based architecture.

A user may access the system 100 via one of the monitoring devices 170 (e.g., a Personal Computer ("PC"), tablet, or smartphone) to view information about and/or manage current information in accordance with any of the embodiments described herein. In some cases, an interactive graphical display interface may let a user define and/or adjust certain parameters (e.g., attack detection trigger levels) and/or provide or receive automatically generated recommendations or results from the classification model creation computer 160 and/or the node classification computer 150.

Figure 2:
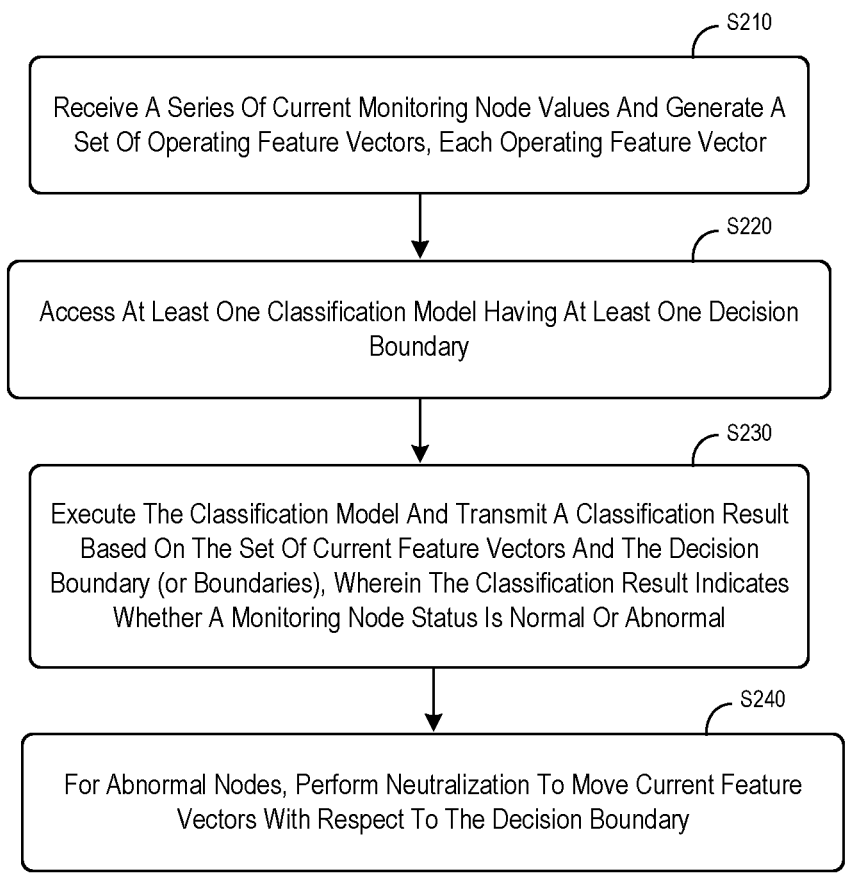
FIG. 2 is an industrial asset protection method according to some embodiments.

The static decision boundary associated with the classification model can be used to detect abnormal operation of an industrial asset. For example, FIG. 2 is an industrial asset protection method according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may receive, from a plurality of monitoring nodes, a series of current values over time that represent a current operation of an industrial asset. The system may also generate, based on the received series of current values, a set of current feature vectors. At S220, a classification model may be accessed including at least one static decision boundary. At S230, the model may be executed and a classification result may be transmitted based on the set of current feature vectors and the static decision boundary when appropriate (e.g., when abnormal operation is detected). According to some embodiments, one or more response actions may be performed when a classification result is transmitted. For example, the system might automatically shut down all or a portion of the industrial asset (e.g., to let the detected potential cyber-attack or fault be further investigated). As other examples, one or more parameters might be automatically modified, a software application might be automatically triggered to capture data and/or isolate possible causes, etc. At S240, the system may perform, localization (e.g., to determine which node caused the abnormal operation) and/or disambiguation (e.g., to determine if an abnormal condition is a result of a fault or a cyber-attack as described herein).

Some embodiments described herein may take advantage of the physics of a control system by learning a priori from tuned high fidelity equipment models and/or actual "on the job" data to detect single or multiple simultaneous adversarial threats to the system as well as to identify faults. Moreover, according to some embodiments, all monitoring node data may be converted to features using advanced feature-based methods, and the real-time operation of the control system may be monitoring in substantially real-time. A static decision boundary may be constructed in feature space using dynamic models and may help enable early detection of vulnerabilities (and potentially avert catastrophic failures) allowing an operator to restore the control system to normal operation in a timely fashion.

Figure 3A:
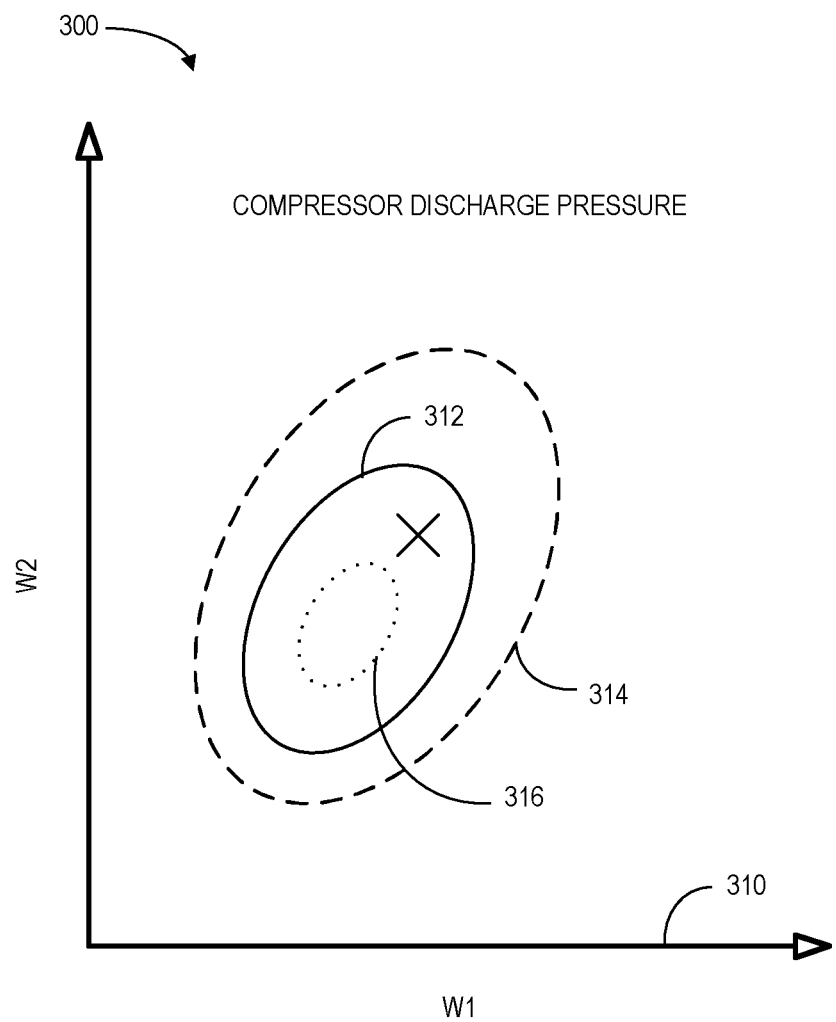
FIGS. 3A and 3B illustrate features, feature vectors, and decision boundaries in accordance with some embodiments.
Figure 3B:
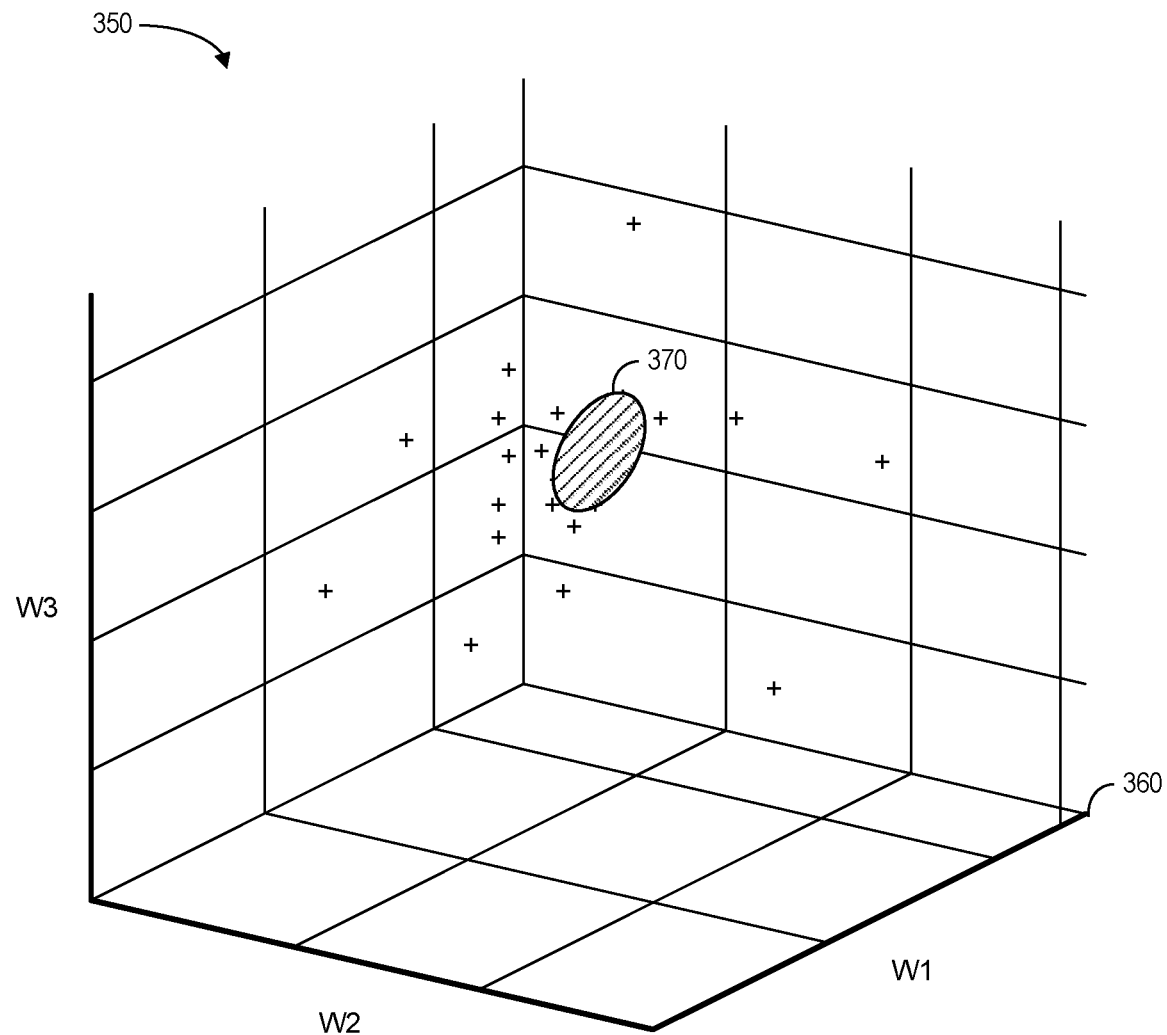

FIGS. 3A and 3B illustrate features, feature vectors, and decision boundaries in accordance with some embodiments. Note that, as used herein, the phrase "decision boundaries" and the term "classifications" may be used interchangeably and may have the same meaning. In particular, FIG. 3A illustrates 300 boundaries and feature vectors for a monitoring node parameter in accordance with some embodiments. A graph 310 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") performed on input data. PCA might be one of the features that might be used by the algorithm to characterize the data, but note that other features could be leveraged. The graph 310 illustrated in FIG. 3 represents compressor discharge temperature for a gas turbine but other values might be monitored instead (e.g., compressor pressure ratio, compressor inlet temperature, fuel flow, generator power, gas turbine exhaust temperature, etc.). The graph 310 includes an average boundary 312 (solid line), minimum boundary 314 (dotted line), and maximum boundary 316 (dashed line) and an indication associated with current feature location for the monitoring node parameter (illustrated with an "X" on the graph 310). As illustrated in FIG. 3, the current monitoring node location is between the minimum and maximum boundaries (that is, the "X" is between the dotted and dashed lines). As a result, the system may determine that the operation of the industrial asset is normal.

FIG. 3B illustrates 350 three dimensions of monitoring node outputs in accordance with some embodiments. In particular, a graph 360 plots monitoring node outputs ("+") in three dimensions, such as dimensions associated with PCA: w1, w2, and w3. Moreover, the graph 360 includes an indication of a normal operating space static decision boundary 370. Although a single contiguous boundary 370 is illustrated in FIG. 3B, embodiments might be associated with multiple regions.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiments ("DoE") techniques. Moreover, multiple algorithmic methods (e.g., support vector machines or other machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Figure 4A:
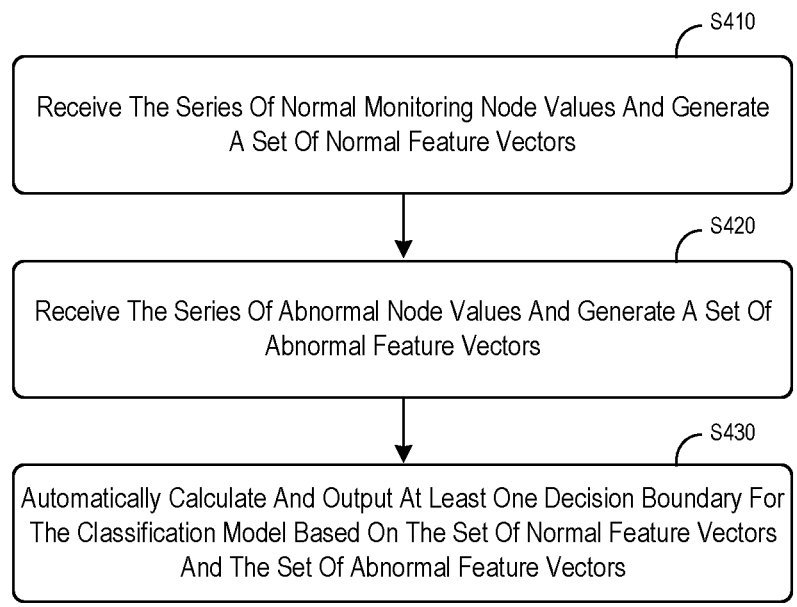
FIG. 4A is a classification model creation method according to some embodiments.

FIG. 4A illustrates a model creation method that might be performed by some or all of the elements of the system 100 described with respect to FIG. 1. At S410, the system may retrieve, for each of a plurality of monitoring nodes, a series of normal values over time that represent normal operation of the industrial asset and a set of normal feature vectors may be generated. At S420 the system may retrieve, for each of the plurality of monitoring nodes, a series of abnormal values over time that represent abnormal operation of the industrial asset and a set of abnormal feature vectors may be generated. The series of normal and/or abnormal values might be obtained, for example, by running DoE on an industrial control system associated with a power turbine, a jet engine, a locomotive, an autonomous vehicle, etc. At S430, a static decision boundary may be automatically calculated and output for a classification model based on the sets of normal feature vector and abnormal feature vectors. According to some embodiments, the static decision boundary might be associated with a line, a hyperplane, a non-linear boundary separating normal space from abnormal space, and/or a plurality of decision boundaries. In addition, note that the classification model might be associated with the static decision boundary, feature mapping functions, and/or feature parameters.

Figure 4B:
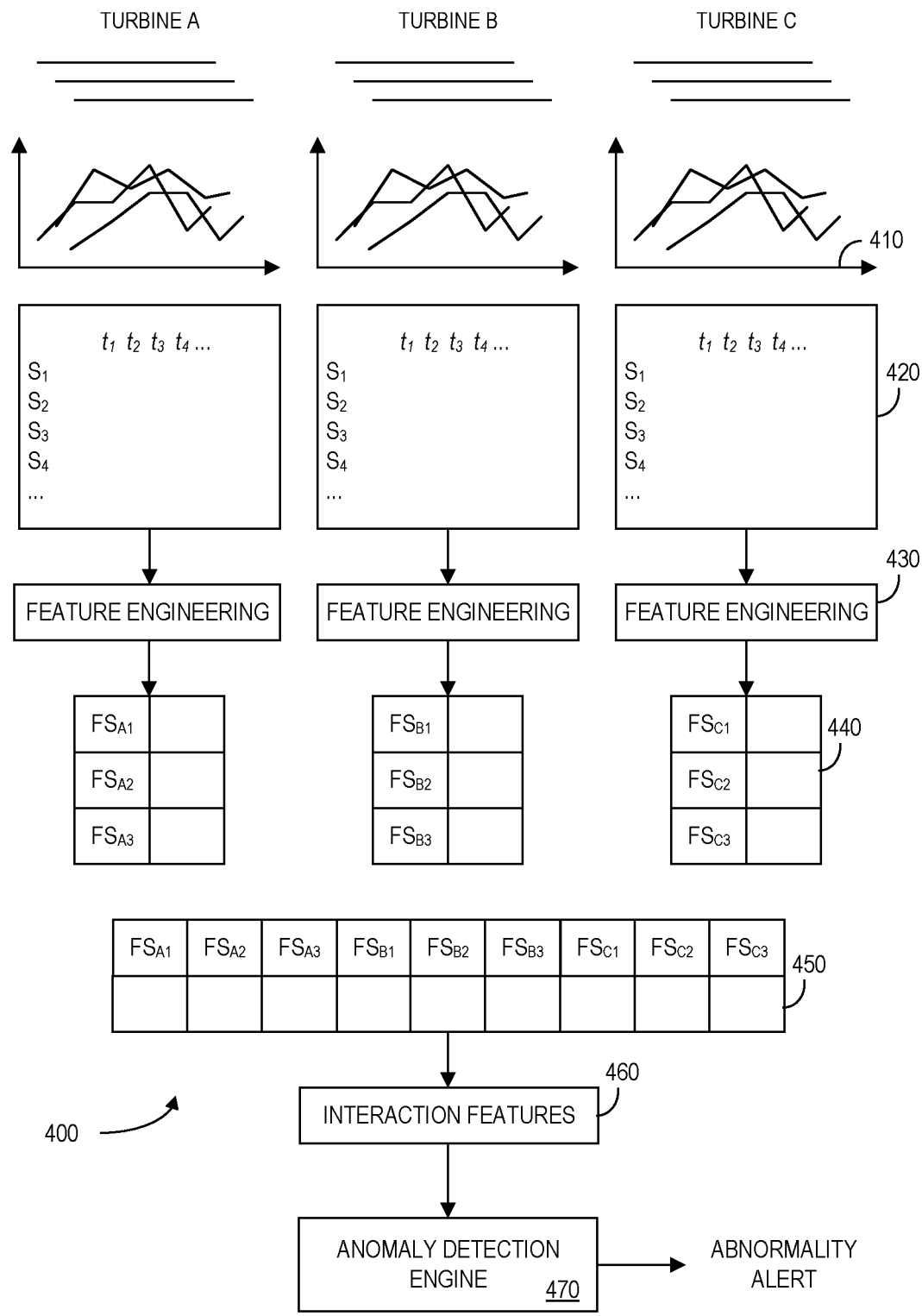
FIG. 4B illustrates a global feature vector according to some embodiments.

In addition to feature vectors that are "local" to monitoring nodes, some embodiments described herein may incorporate one or more "global" feature vectors. For example, FIG. 4B illustrates 400 a global feature vector according to some embodiments. In particular, the system 400 includes three turbines (A, B, and C) and batches of values 410 from threat nodes are collected for each generated over a period of time (e.g., 60 to 80 seconds). According to some embodiments, the batches of values 410 from threat nodes overlap in time. The values 410 from threat nodes may, for example, be stored in a matrix 420 arranged by time ($t_1$, $t_2$, etc.) and by type of threat node ($S_1$, $S_5$, etc.). Feature engineering components 430 may use information in each matrix 420 to create a feature vector 440 for each of the three turbines (e.g., the feature vector 440 for turbine C might include $FS_{C1}$, $FS_{C2}$, etc.). The three feature vectors 440 may then be combined into a single global feature vector 450 for the system 400. Interaction features 460 may be applied (e.g., associated with A*B*C, A+B+C, etc.) and an abnormality detection engine 470 may compare the result with a decision boundary and output an abnormality (e.g., threat or fault) alert signal when appropriate.

Thus, embodiments may provide a unified system to classify the status of an industrial control system having a plurality of monitoring nodes (including sensor, actuator, and controller nodes) as being normal or abnormal. The system may be configurable and may detect both intelligent adversarial attacks and naturally occurring faults in each monitoring node.

Figure 5:
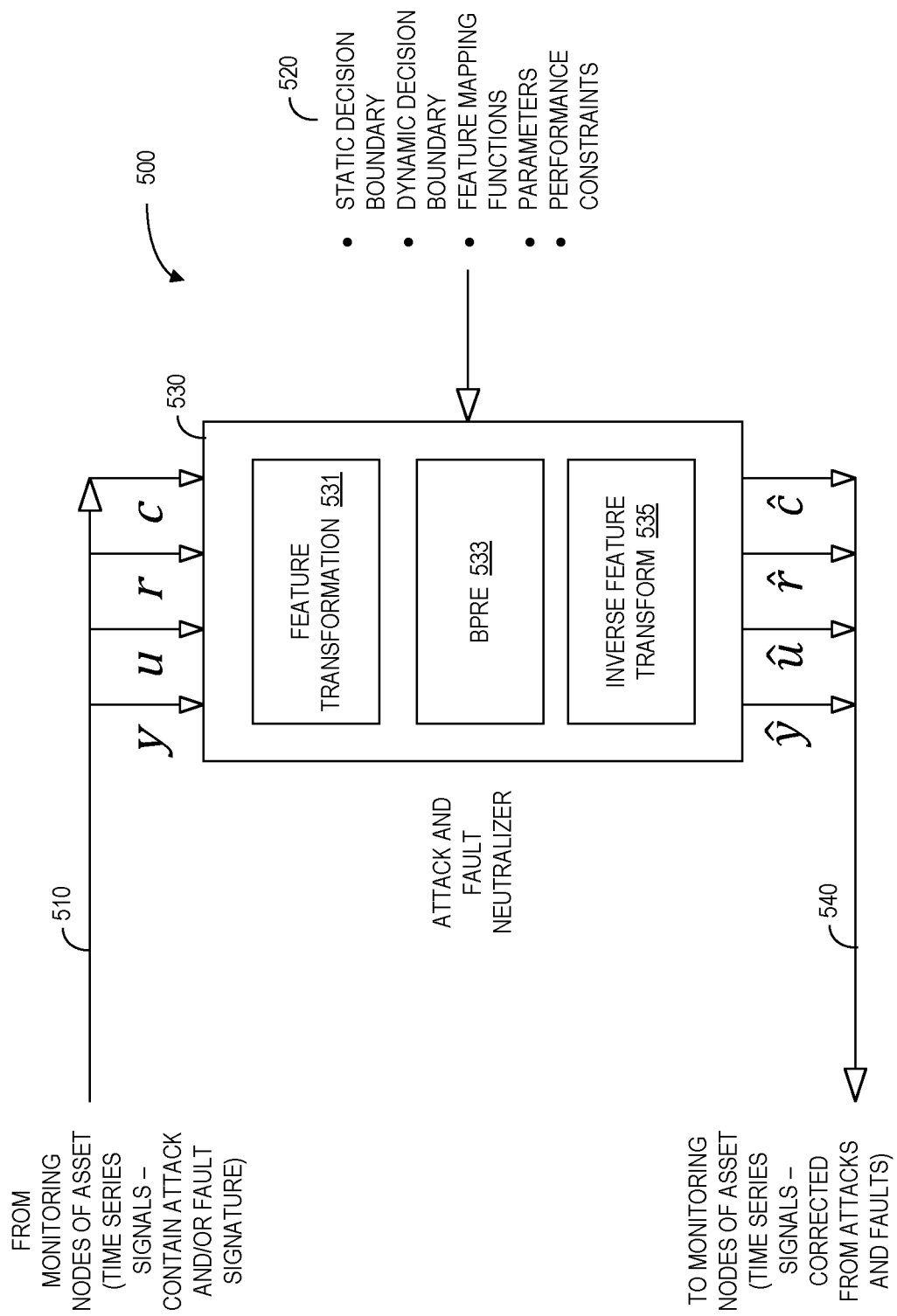
FIG. 5 is a diagram illustrating a threat neutralizer for filtering input signals in accordance with an example embodiment.

FIG. 5 is a diagram illustrating 500 an attack and fault neutralizer 530 for filtering input signals in accordance with an example embodiment. The example embodiments are directed to a system and method for identifying and neutralizing threats that occur in systems, for example, control systems for industrial manufacturing. The method described herein may achieve resiliency to cyber-attacks to provide uninterrupted, equipment-safe, controlled operation while attacks are in progress. As described herein, resiliency is the ability of a control system to force signals (or states) required for operational normalcy. As in a human body, once the method described herein detects a threat (e.g., an infection), the method destroys the threat. Analogous to biomimicry stated above, the example embodiments are directed to a method that extends domain-level security by creating a cyber-based "immune system" specifically desirable to industrial systems.

The methods herein are not only able to identify threats, but may also block the threats by automatically neutralizing their effects on the control system even while the attacks are in progress. Neutralization of the affects may be achieved at key signals by estimating true operational states of the system with a Boundary and Performance-constrained Resilient Estimator ("BPRE"). Furthermore, true signals for operational normalcy may be computed from estimated states enabling the system to continue to function properly. The method and system described herein can deter threats by replicating protection mechanisms adapted by biological systems. How the human body fights off pathogens and other infections is a natural marvel. It automatically detects and triggers a self-defense mechanism to fight. The example embodiments replicate a similar kind of automatic detection and trigger functions for masking or otherwise neutralizing the attack signals. The neutralization approach disclosed here can also be used for securing any system where continuous data stream is available for monitoring purpose.

The neutralization methods described herein may be implemented as software such as an application or a service and may be incorporated within an industrial system such as a control system, a computer, a server, a cloud platform, a machine, an equipment, an aircraft, a locomotive, and the like. While progress with machine and equipment automation has been made over the last several decades, and assets have become "smarter," the intelligence of any individual asset pales in comparison to intelligence that can be gained when multiple smart devices are connected together, for example, in the cloud. As described herein, an asset is used to refer to equipment and/or a machine used in fields such as energy, healthcare, transportation, heavy manufacturing, chemical production, printing and publishing, electronics, textiles, and the like. Aggregating data collected from or about multiple assets can enable users to improve business processes, for example by improving effectiveness of asset maintenance or improving operational performance if appropriate industrial-specific data collection and modeling technology is developed and applied.

For example, an asset can be outfitted with one or more sensors configured to monitor respective operations or conditions thereof. Data from the sensors can be added to the cloud platform. By bringing such data into a cloud-based environment, new software applications and control systems informed by industrial process, tools and expertise can be constructed, and new physics-based analytics specific to an industrial environment can be created. Insights gained through analysis of such data can lead to enhanced asset designs, enhanced software algorithms for operating the same or similar assets, better operating efficiency, and the like. However, when data is transferred from an edge of the cloud to the cloud platform, attacks may occur. The attacks may affect the processing of signals received from the edge of the cloud. The example embodiments provide a neutralization process that is capable of filtering signals that are transmitted from the edge to the cloud platform back-end, as well as transmitting in other situations.

Assets described herein can include or can be a portion of an Industrial Internet of Things ("IIoT"). In an example, an IIoT connects assets including machines and equipment, such as turbines, jet engines, healthcare machines, locomotives, oil rigs, and the like, to the Internet and/or a cloud, or to each other in some meaningful way such as through one or more networks. The examples described herein can include using a "cloud" or remote or distributed computing resource or service. The cloud can be used to receive, relay, transmit, store, analyze, or otherwise process information for or about one or more assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

The integration of assets with the remote computing resources to enable the IIoT often presents technical challenges separate and distinct from the specific industry and from computer networks, generally. A given machine or equipment based asset may need to be configured with novel interfaces and communication protocols to send and receive data to and from distributed computing resources. Assets may have strict requirements for cost, weight, security, performance, signal interference, and the like, in which case enabling such an interface is rarely as simple as combining the asset with a general purpose computing device. To address these problems and other problems resulting from the intersection of certain industrial fields and the IIoT, some embodiments provide a cloud platform that can receive and deploy applications from many different fields of industrial technologies. In order for these applications to successfully consume data from machines and equipment also connected to the cloud, the embodiments provide a threat neutralization method that can be implemented within the cloud and that can filter signals between an edge of the cloud and the cloud platform enabling the control of the asset to be maintained as normal.

The threat neutralizer 530 of FIG. 5 may be implemented within an asset or a device associated therewith, within a control system or a device associated with or coupled to the control system, within a cloud platform, within an intermediate device, and the like. There is no limitation on a location of the threat neutralizer 530. The threat neutralizer 530 may receive signals that have been sensed from or about an asset such as a gas turbine, a wind turbine, a locomotive, an aircraft, a healthcare machine, an industrial manufacturing machine, drilling machinery/equipment, mining machinery/equipment, and the like. The threat neutralizer receives at least one input signal 510 that includes time series data. The time series data may include measurements or other readings captured by a monitoring node at various time intervals. Examples of time series data include speed, intensity, acceleration, weight, force, thrust, and the like.

When deployed and operating, assets may be attacked or otherwise compromised. As a result, the data received from an asset (e.g., input signals 510) may be faulty or otherwise inaccurate. There are many different types of attacks that an asset system may be subjected to such as espionage attacks, denial of service attacks, deception attacks (e.g., covert/stealthy attack, zero dynamics attack, false data injection attack, replay attack, and the like, which are just a short sampling of potential threats that exist. Present information technology and operational technology approaches do not adequately protect the system automatically. In contrast, as further described herein, the threat neutralizer 530 may automatically detect and neutralize the effects of an attack within an input signal 510 just as a human immune system is capable of detecting and neutralizing an infection or other disease.

As an example, the threat neutralizer 530 may be included in a general system such as a cyber-physical system, a software system, a bio-mechanical system, a network system, a communication system, and/or the like, which contains access to continuous stream of data in the form of time series signals. The time series signals may be generated from output sensor nodes (e.g., physical and/or virtual sensor signals y), actuator nodes (e.g., hard and/or soft actuator signals u generated from open or closed loop system), controller nodes (e.g., controller node signals c), reference nodes (e.g., reference signals r), and the like. In some examples, logical signals may also be considered as time series signals. A total number of signals that may be used for providing immunity to a system may be equal to a total number of nodes that exist in sensors, actuators, controllers and reference nodes, or it may be more or less nodes. Some or all combinations of these nodes can be used for monitoring and neutralization.

In the example of FIG. 5, the threat neutralizer 530 includes multiple computational blocks including a feature transform 531, a BPRE 533, and an inverse feature transform 535, which are further described herein. Using a dynamic or a static model obtained through system identification or other known modeling methods, the BPRE 533 is designed to compute an estimate of the true value of the feature vector under adversarial attacks. The computational elements inside the threat neutralizer 530 may thus act as a filter to remove attack signatures present in each node. As a result, an output signal 540 (or neutralized signals) may contain true estimates of signals at these nodes for use with the rest of the system for operational normalcy.

Feature Transform:

For a given scenario, time series signals (e.g., ~45 seconds) may be captured and pre-processed. These signals may be processed by the feature transform 531 into feature extraction algorithms (e.g., principal component analysis) to reduce the dimensionality or order of the system. For example, time series data from sensor nodes may be converted into feature vectors. The procedure is same for all other signals. When principal components are used as features as in the current implementation, weights become the features in reduced dimensions within the feature space. In the pre-processing step performed by the feature transform 531, temporal normalization of node data may be performed. As an example, when principal components are used as features, the normalized output may be expressed as a weighted linear combination of basis functions. In this feature extraction algorithm, weights are considered as features for y.

$$y = y_0 + \sum_{j=1}^{M} w_j \psi_j$$

$$w_j = \psi_j^T (y - y_0)$$

In this example, $y_0$=average sensor output, $w_j$=jth weight (i.e., PCA feature), and $\omega_j$=jth basis vector. Because of the orthonormal nature of the basis vectors, each feature may be computed using the equation shown above. The basis vectors can be obtained using ensemble data set from the system collected over time (i.e., historical data) or with perturbations on a virtual model (e.g., digital twin) of the asset.

System Identification (Dynamic Modeling):

Under normal operation, features are extracted from overlapping batch of a time series data by the Feature Transform unit 531. The process may be continued by the Feature Transform unit 531 over each overlapping batch resulting in a new time series of feature evolution in the feature space. Then, the feature time series are used for performing system identification (i.e., dynamic modeling). A selected subset of the features may be used for dynamic modeling using state space system identification methods. For example, in a gas turbine system, out of 15 PCA features for each sensor node, 5 PCA features may be used.

The dynamic models are in the state space format. The dynamic modeler may use multivariate vector autoregressive model (VAR) for fitting dynamic models into feature time series data. If this approach is not adequate, another model may be used such as a tuned feature-based digital twin model, or a static model computed from feature evolution data or a priori to obtain various matrices representing state space form (i.e., system matrix, control matrix, output matrix and feedforward matrix; i.e., {A, B, C} matrices). In the example of a gas turbine system, the time-series evolution of the features may be modeled using the following state-space dynamics:

$$x(k+1)=Ax(k)+b$$

$$y(k)=Cx(k)+e(k)$$

In this equation, e(k) is the attack component of the "measured" feature vector, y(k). Here, x(k) is the "true" feature vector to be determined. System matrix, A, control vector, b, and output matrix, C, are computed offline using experimental and simulated data and may be updated in real-time using real-time features obtained from actual sensor measurements.

Figure 6:
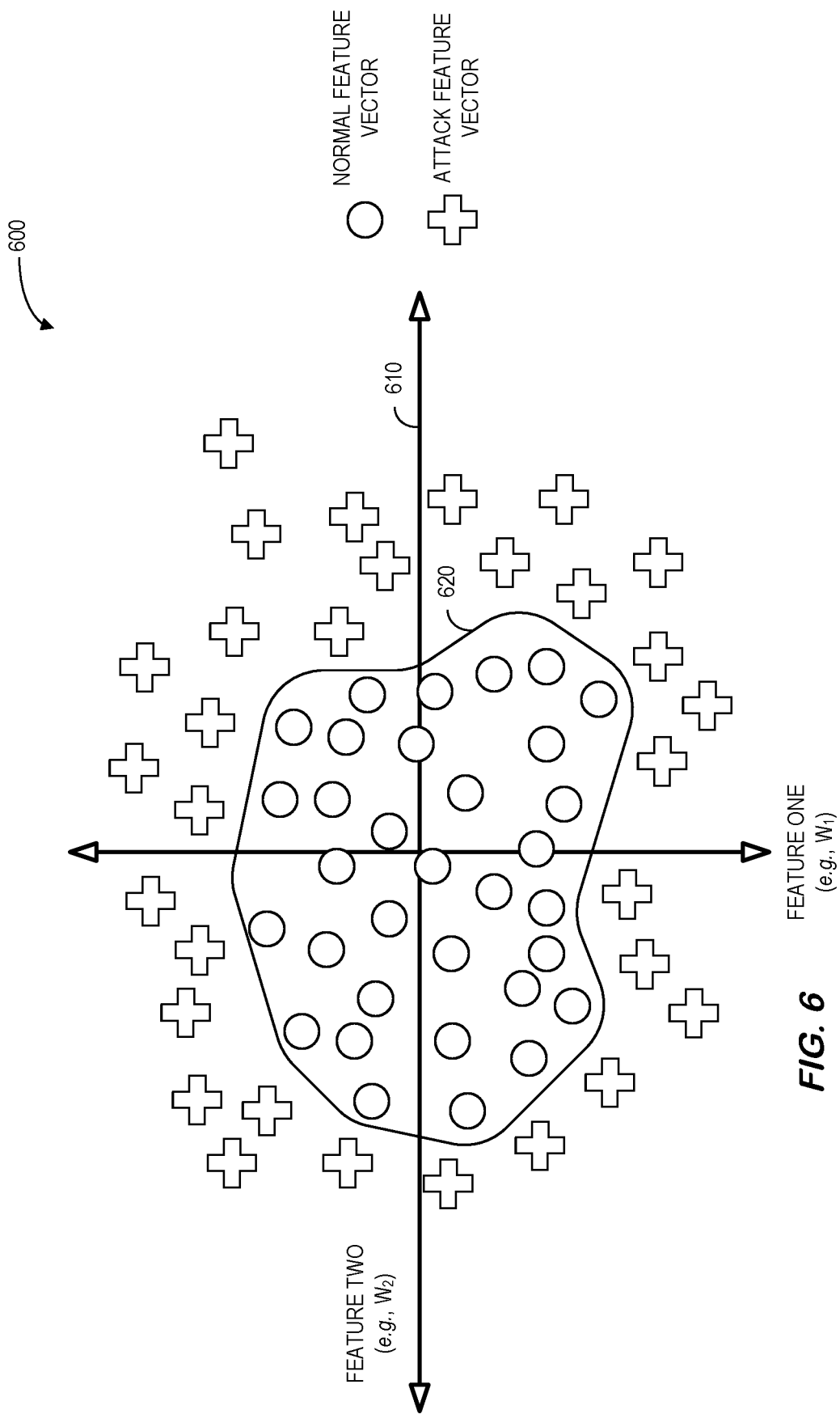
FIG. 6 is a diagram illustrating a boundary and performance estimation process for threat detection in accordance with an example embodiment.

Boundary and Performance Constrained Resilient Estimator "(BPRE)":

The example embodiments attempt to estimate true states using a modified resilient estimator or BPRE 533. Using a model represented by the operator, Ω(A, b, C), such as for the example state-space model shown in the above equation, the BPRE 533 may be designed to estimate the true value of the feature vector under adversarial attacks. The BPRE 533 is a resilient estimator that may solve the following optimization problem:

$$\underset{x_k \in \mathbb{R}^n, k \in \{1,\ldots,T\}}{\text{minimize}} \sum_{k=1}^{T} \|y_k - \Omega(A, b, C)x_k - y_b\|_q + \frac{1}{2}\rho \sum_{j=1}^{T-1} \|x_j^{prev} - x_j\|_2^2$$

subject to 
$$\text{score}(x_k, p_1) \leq -\epsilon$$
$$|f(x_k, p_2)| \leq \varepsilon$$
for $k \in \{1, \ldots, T-1\}$ In this example, $y_k$ is the sequence of measured/observed values, $x_k$ is the feature vector in the current time step, $x_k^{prev}$ is the feature vector in the previous time step, Ω(A, b, C) is an operator representing state space model or a transfer function from the feature space to the signal space. $p_1$ and $p_2$ are respective parameter values for the boundary and invariance relationship. q is used to describe optimization approach such as $l_1$ when q=1, $l_2$ when q=2 well-known in the optimization literature. The first constraint in the optimization may ensure that the final estimate falls within the safety envelop with some factor of safety given by E which can be an arbitrary positive number, or something more intuitive like the distance of the farthest support vector from the multi-dimensional decision boundary. The BPRE 533 may compute a threat/attack boundary and also compute a performance constrained resilient estimator from the normal data values received historically from the asset. FIG. 6 illustrates conceptually an example of a static decision boundary 620 and performance estimation process for threat detection in accordance with an example embodiment. In the example of FIG. 6, a graphical view 600 of the static boundary constraint 620 on a two-dimensional axis 610 is shown. A "score" function may depend a on a particular algorithm used to learn the safety envelop. For instance:

$$\text{score}(x,p) = \phi(x)^T p_{[1:n]} + p_0$$

This may define a safety envelop obtained using a Support Vector Machine ("SVM") with kernel function φ(•). The second constraint is related to achieving normal performance by the system. Here, the ensuing solution may satisfy an implicit invariance relationship inherent to the system that was operating normally. This constraint is termed "performance constraint" and may be required during optimization. The value ε is used to capture the uncertainty due to noise in the system. For example, in the case of PCA, the invariance relation is captured by the singular vectors corresponding to the smallest singular values of the feature covariance of data matrix. For example, let Y=[$y_1 \ldots y_r$] be the data matrix constructed using ensemble data set from the system collected over time (i.e., historical data) or with perturbations on digital twin models of the asset with each row being the corresponding instantaneous time-series measurement. Then the invariance relationship is captured by the linear inequality l≤VY≤u, where (l, u) are the minimum and maximum values in the matrix VY and the columns of V are the singular vectors of $Y^T Y$ corresponding to the smallest singular values.

In FIG. 6, the feature vectors corresponding to normal operating signals are not considered potential threats while the feature vectors positioned outside the static boundary 620 are considered threats or attack signals. These points outside the static boundary 620 may also be referred to as attack points or faults. These attack points may be due to cyberattacks moving the previously normal feature vectors represented by points anywhere near or on the normal performance region to anywhere to the attack region designated by points. Referring now to both FIGS. 5 and 6, if the feature vectors are outside the boundary 620, indicating an abnormal event (e.g., attack), the BPRE estimator 533 can find an estimate of the feature vector along performance constraints inside the boundary 620 that preserves the normal operation of the asset with respect to the control system or other device connected to the asset.

The optimization used according to some embodiments may contain two weighted objectives. The first objective involves a q-norm (q∈{0, 1, 2, . . . }) of the error between observed and modeled features. Although, q=0 is ideal for this problem, it results in an NP-hard problem. Consequently, in order to have a well-behaved convex program, the value q≥1 may be used, where the particular value used in any case may depend on the desired error characteristics for that case. For instance, the value q=1 may provide the closest approximation to the ideal case but results in a mixed-norm problem while the value q=2 is further from ideal but unifies the norm in the objective and the overall optimization problem is a subclass of the well-known second order cone program. The measured, as well as estimated "true" feature vectors may then be transformed into time series signal by inverting the feature transform.

Inverse Feature Transforms:

When PCAs are used as feature vectors, being a linear transform, inversion can be obtained by the inverse feature transform unit 535. For example, estimated true features may be used to perform a weighted linear sum of basis vectors and then sum the signals with average sensor output. The inverse feature transform unit 235 may transform the features obtained from the boundary and performance constrained resilient estimator back to the signal space. In this example, the true signal for normalcy under attack is given by:

$$\hat{y} = y_0 + \sum_{j=1}^{M} \hat{w}_j \psi_j$$

Where,
$\hat{y}$=Estimated Sensor time series data
$y_0$=Average sensor output as before
$\hat{w}_j$=Estimated $j^{th}$ feature
$\psi_j$=$j^{th}$ basis vector Feature Transform:

For a given scenario, time series signals (e.g., ~45 seconds) may be captured and pre-processed. These signals may be processed by the feature transform 531 into feature extraction algorithms (e.g., principal component analysis) to reduce the dimensionality or order of the system. For example, time series data from sensor nodes may be converted into feature vectors. The procedure is same for all other signals. When principal components are used as features as in the current implementation, weights become the features in reduced dimensions within the feature space. In the pre-processing step performed by the feature transform 531, temporal normalization of node data may be performed. As an example, when principal components are used as features, the normalized output may be expressed as a weighted linear combination of basis functions. In this feature extraction algorithm, weights are considered as features for y.

The BPRE 533 forces the estimates of the attacked sensor signals back into the normalcy boundary 620 which also translates to normal operation of the original system. As a result, neutralized signals 540 are output from the threat neutralizer 530. This inversion approach assumes that the feature transform algorithm is well defined and has only trivial kernels (at least injective). A Multi-Mode, Multi-Discipline ("MMMD") feature discovery framework may be used to identify knowledge-based, shallow and/or deep learning features. Note that the MMMD feature discovery framework may be associated with feature engineering (e.g., associated with analysis such as batch selection, basis vector computation, feature extraction, dimensionality reduction, etc.) and engineered and dynamic system feature vectors. Knowledge-based feature engineering may use domain or engineering knowledge of the system to create features from different sensor measurements. These features might simply be statistical descriptors (e.g., maximum, minimum, mean, variance, different orders of moments, etc.) calculated over a window of a time-series signal and its corresponding Fast Fourier Transformation ("FFT") spectrum as well. The knowledge-based features might also utilize analysis of the system, such as basis vector decomposition, state estimation, observability matrices, topology matrices, system plant matrices, frequency domain features and system poles and zeros. These analyses may represent a characterization of the system through steady-state, transient, and small signal behaviors. The feature extraction process may be further associated with a shallow feature learning technique, such as unsupervised learning, k-means clustering, manifold learning, non-linear embedding, an isomap method, Locally Linear Embedding ("LLE"), PCA as described above in one example, Non-linear PCA, Independent Component Analysis ("ICA"), neural networks, a Self-Organizing Map ("SOM") method, genetic programming, and/or sparse coding. A numerical inversion algorithm may be used to convert true features to their equivalent time series form when the features are not well defined as in the PCA case described above. Furthermore, smoothing of the time series signal from previous batches may be required while performing continuous updates.

Figure 7:
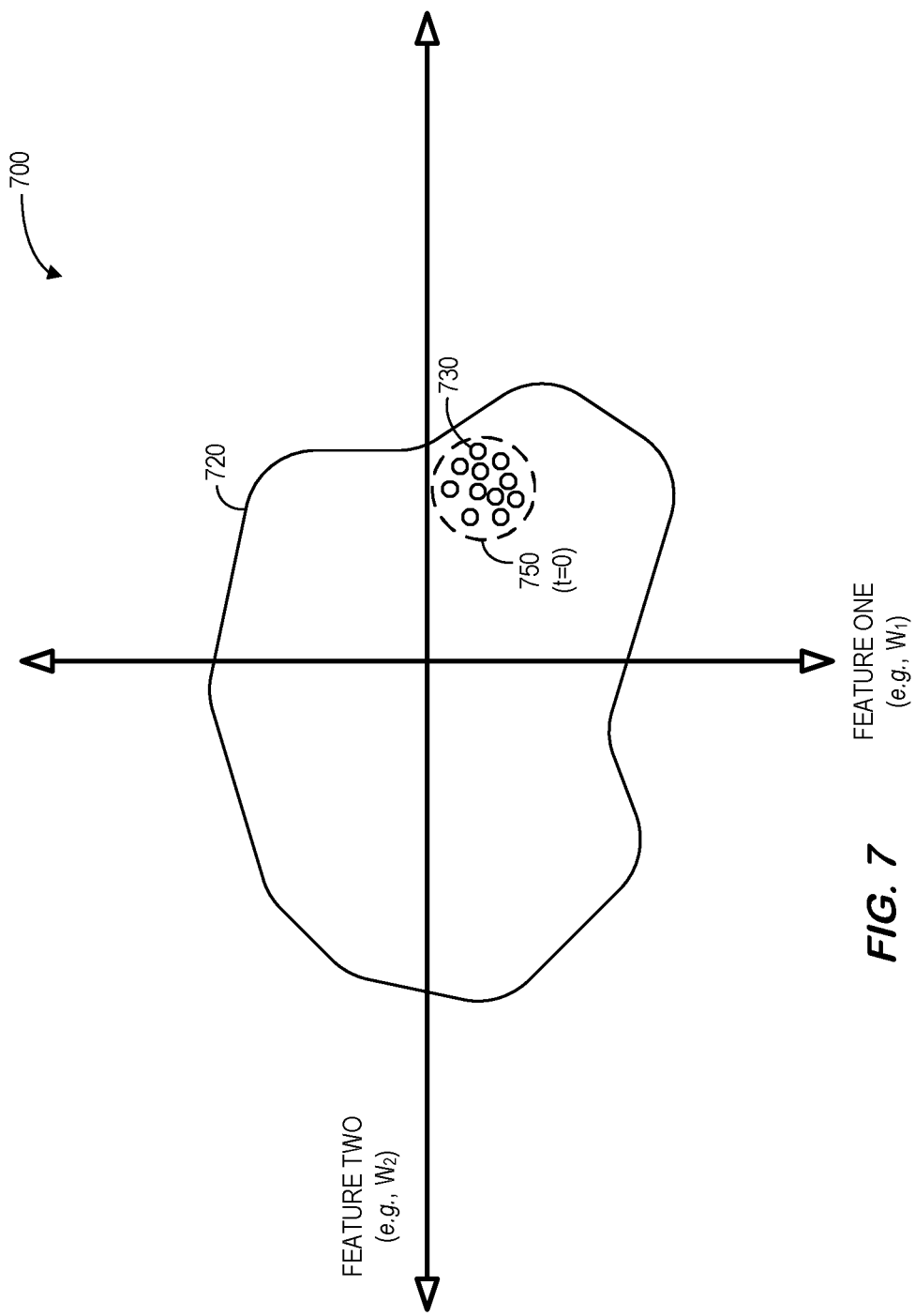
FIG. 7 is an example including a dynamic decision boundary according to some embodiments.

In addition to the static decision boundary 620, some embodiments may utilize a dynamic decision boundary based on current industrial asset operation. For example, FIG. 7 is an example 700 including a dynamic decision boundary 750 according to some embodiments. Note that some embodiments described herein may include dynamic and/or concurrent learning methods. Such an approach may act as a filter to remove the effects of attacks on the monitoring nodes forcing the control system to operational normalcy that existed just before the attack took place or to near normalcy or to a predetermined/system-recommended safe zone when all monitoring nodes are attacked with malicious intent. Novelty may include the use of two global decision boundaries and learning from field data. They are updated with continuous stream of data from monitoring nodes. First, a decision boundary is built in the factory (called static decision boundary 720) with offline using high fidelity model or field data. This boundary 720 normally covers a larger normal operating space, is adapted at a predetermined time interval and used concurrently with a dynamic decision boundary during normal operation. The second decision boundary 750 is a shell enclosed around the more recent field data from monitoring nodes (called a dynamic decision boundary 750). The dynamic decision boundary 750 may be updated more frequently than the static decision boundary 720 during normal operation and is used concurrently with the static decision boundary 720. The dynamic decision boundary 750 covers a more restricted normal operating space. During real-time operation, the dynamic decision boundary 750 is learnt continuously from stream of data from monitoring nodes. Both boundaries 720, 750 may be used to estimate new time-series signals. Estimated time-series signals may then be compared to true reference signals from the system (or precomputed offline) which may also be dynamically updated and concurrently used. Estimated time-series signals with lowest error with respect to the pre-defined/pre-computed true reference signals may be selected for neutralizing the effects of the attack or system related naturally occurring faults.

The use of dynamic and static decision boundaries 750, 720 concurrently may allow for accurate detection with low false positives. Thus, embodiments may achieve resiliency to cyberattacks and to naturally occurring faults and provide uninterrupted, equipment-safe, controlled operation while attacks are in progress to any number of monitoring nodes.

Some embodiments described herein are illustrated conceptually with the graphical view 700 of FIG. 7 which shows regions separating normal and abnormal space. This description uses gas turbine as an example throughout to clearly illustrate how the approach works. Note, however, that the methods described herein are applicable to any physical system with access to monitoring nodes involving continuous steam of sampled data from any or all the nodes (i.e., from input nodes, controller nodes, reference nodes, and output nodes).

For simplicity, a two-dimensional coordinate space is illustrated. Each point in this space is represented by two features. Features are a high-level abstraction of the time domain signals that are extracted simultaneously from as many monitoring nodes as one decides to use for the purpose in hand and for over a period of operation (e.g., a batch of length 45 seconds in a gas turbine system or a batch of 5 seconds in an electric generator system, etc.). As the system evolves over time, features also evolve. For example, features may be extracted from successive over-lapping batches of length 45 second. Overlaps are created with one second new data being added to the leading edge of the batch and one second data removed from the trailing edge. In this way, new features are constructed for the batch every second and is represented by the dots 730 in FIG. 7.

The separation boundary 720, (called a "static decision boundary") is constructed offline by creating many dots 730 (called a data set) with numerous simulated conditions, i.e., normal and attack/faulty scenarios, and by running those scenarios in high-fidelity. Attack/faulty scenarios are abnormal data sets and normal scenarios are healthy and likely operational scenarios at any given time over the life of the asset. When high-fidelity models of the system are not available (such as in legacy systems), multiple data-driven models may be constructed offline with streams of data from operating systems over a period. Attacks/faults may then be synthesized numerically to create the training data set required for obtaining the static decision boundary. Machine learning algorithms such as Support Vector Machine ("SVM") or Extreme Learning Machine ("ELM") may then be used to obtain the parameters for the static decision boundary 720. Thus, the static decision boundary 720 is a trained mathematical function representing the separation boundary.

A separation boundary can also be a dynamic decision boundary 750 which uses a trained mathematical function. For example, the dynamic decision boundary 750 may be a mathematical function that represents a shell enclosing the more recent field data points from monitoring nodes. The enclosed function can be constructed using 1-class semi-supervised machine learning algorithms such as SVM or ELM on a training data set from operating machine. It is not created with any attack/fault scenarios. The dynamic decision boundary may be updated more frequently (e.g., every 5 second in a gas turbine system) and this kind of learning happens un-interrupted in the background without the attack/faulty data set. The static decision boundary 720 may also be updated or adapted from field data but is done less frequently. For example, it can be initiated automatically once in few months or whenever the system is upgraded with new hardware. The operator can also manually initiate the updates. It is to be noted that the dynamic decision boundary 750 covers a small operating region when compared to static decision boundary 720. The dynamic decision boundary 750 evolves more rapidly due to high update rate and due to changes occurring in the system during normal operation affected by various environmental conditions (e.g., humidity, pressure, or temperature).

Figure 8:
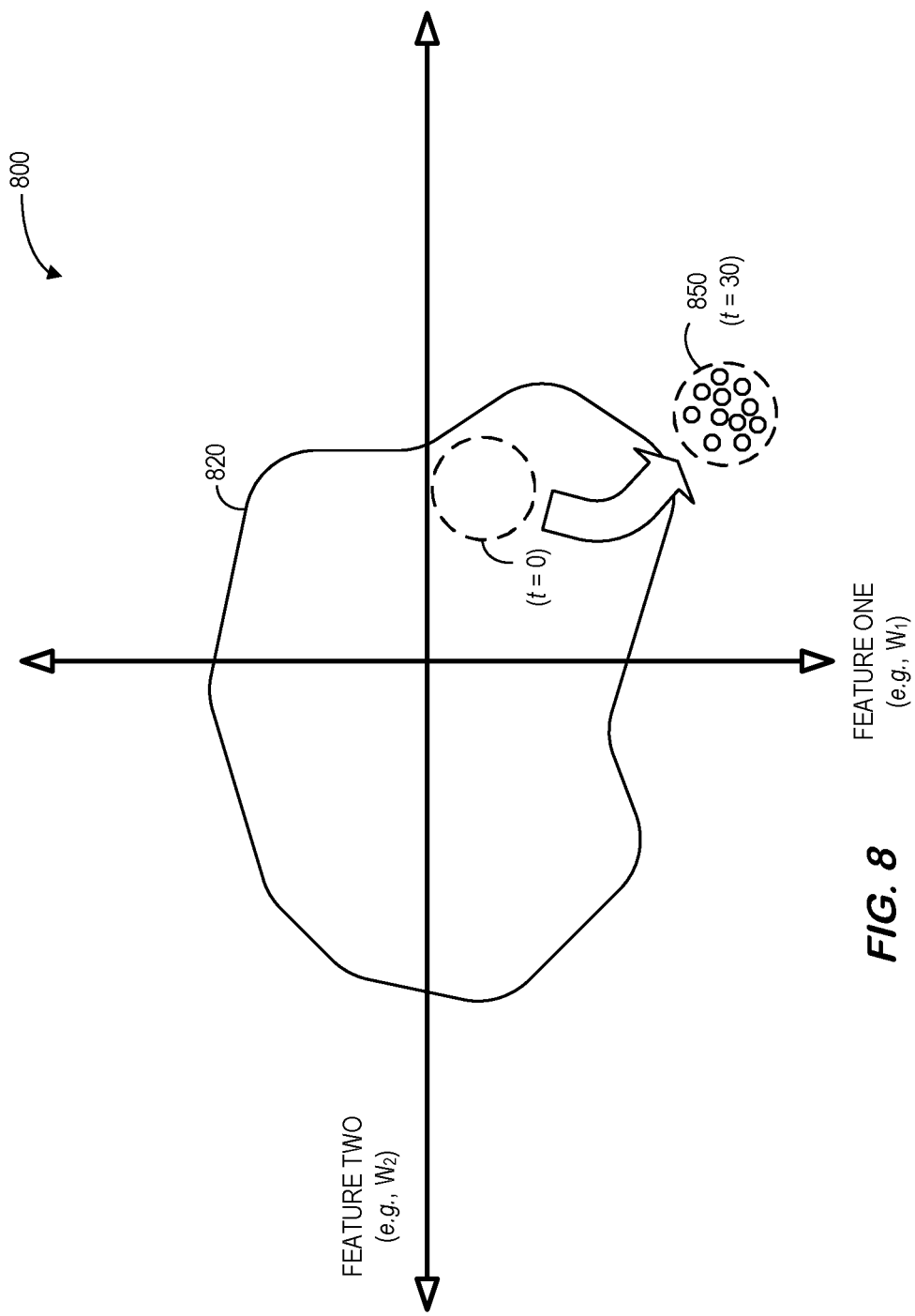
FIG. 8 illustrates an industrial asset having feature vectors moving outside a static decision boundary in accordance with some embodiments.

FIG. 8 illustrates 800 a static decision boundary 820 and a dynamic decision boundary 850 that has move from a location inside the defined region (at t=0) to a location outside the define region (at t=30) when only a subset of the monitoring nodes is simultaneously attacked/faulted (that is, the number of abnormal monitoring nodes is below a pre-determined threshold value. As an example, for a gas turbine rapidly changing over time as in the case of load sweeps, within the dynamic decision boundary 850 are a number of dots each representing one second of features. The dynamic decision boundary 850 might be, for example, updated every 10 seconds. After successive time intervals, the dynamic decision boundary 850 may move to a new region. As shown, it has now crossed the static decision boundary 820. While the features evolve over time, the following two estimators may be solved using decision boundaries 820, 850 as constraints:

$$\text{Minimize} \|W_k - W_0 - \Phi g\|_{l_0} \quad (1)$$
$$\text{Subject to } s_p(g)|_{static} \leq \varepsilon_s$$

$$\text{Minimize} \|W_k - W_0 - \Phi g\|_{l_0} \quad (2)$$
$$\text{Subject to } s_{k-\Delta}(g)|_{dynamic} \leq \varepsilon_d$$

where, $W_k$ is a feature vector obtained from the data at a given time instance in time, preferably at times before the current time (i.e., at 0 or 15 seconds just before it crossed the static decision boundary 820). $W_0$ is a centroid of feature vectors, $\phi$ is a matrix comprising of basis vectors. The minimization equation contains global feature vectors, g, which may provide an improved solution. Inverse feature transform of optimal estimated global feature vector will produce the signal in time domain for all the monitoring nodes. $s_p^{(g)}|_{static}$ and $s_{k-\Delta}^{(g)}|_{dynamic}$ are functions of global feature vectors, respectively correspond to static and dynamic decision boundaries. The static decision boundary 820 may be updated at instances p and the dynamic decision boundary 850 is boundary is updated at instances k-Δ. In the example shown, Δ could correspond to 15 seconds or 30 seconds or 60 seconds. $\varepsilon_S$ and $\varepsilon_D$ are parameters/slack variables that may be used to create a tighter boundary. For example, as in a SVM, zero values correspond to hard decision boundary and non-zero values to soft decision boundaries. More negative values give rise to soft decision boundary. Soft decision boundaries are preferred because it gives rise to much tighter decision boundary and has the potential to give robust estimation.

The above estimators represent boundary constrained estimators. Other constraints such as the impact on the grid can also be included as additional constraints so that the optimizer can generate estimates to mitigate the impact. For example, a threshold on frequency deviation is one such parameter. Over/under frequency may lead to isolation of the power plant by relays. Threshold on average bus voltage deviation is another quantity of interest. Overvoltage may trigger the relay to isolate the substation. Poor damping of power grid may lead to sustained oscillations, which can be yet another threshold to consider.

$$\text{Frequency deviation}(g) \leq T_F; \text{Voltage deviation}(g) \leq T_V;$$
$$\text{Damping ratio deviation}(g) \leq T_D \quad (3)$$

Nominal values for these thresholds are: $T_F$=0.2 Hz; $T_V$=0.05 p.u.; $T_D$=10-15% (p.u. represents per unit=real value/rated value). A goal of the constrained optimal estimator is to estimate the global feature vector, g, constrained by each decision boundaries so that the inverse feature transform of estimated global feature vectors lay inside the static decision boundary and when used in the system, it will be driven close to expected normal operation neutralizing the effects of attacks/faults in the monitoring nodes. To select the best estimated global feature vector, the system may perform a comparison of estimated time series signal (resulting from inverse feature transform of estimated global features) to a true reference signal. Mean square error may be computed between estimated time series signal from static decision boundary to true reference signal. A similar metric may be used to compute errors between estimated time series signal from dynamic decision boundary to true reference signal. The best estimated time series signal can then be selected based on the lowest mean square error.

It is to be noted that the true reference signal might be provided for each monitoring node. In the example of FIG. 8, the true reference signal is dynamic and is obtained from past measurements (e.g., Δ units) or from historical data base to always drive the system closer to the desired healthy state. In the example, true healthy state is at t=0 seconds (i.e., the centroid of the feature vector), the region from where the system started to move toward abnormal space. The length of the time series signal may, according to some embodiments, correspond to the batch length used to compute features. In this example, the true reference signal is a dynamic feature vector determined on the fly.

When all monitoring nodes are attacked, the system will be driven to a state at which true reference signal is. For example, at the time the attack was initiated, if the gas turbine system was running at constant load, say 150 MW, then the estimated time series signal will return the system in the neighborhood so that it continues to generate close to 150 MW, nearly in an open loop fashion. If the gas turbine was running under load transients, say load ramping at 18 MW/min, the estimated true signal should be varied to follow the desired ramp. Methods to vary estimated true signal when all monitoring nodes are attacked/faulted can depend on dynamic concurrent learning from other external factors such as driving the system to a predetermined safe zone (described in next subsection), use of demand information from the grid operator/energy market conditions, use of regions weather information etc.

In scenarios where not all monitoring nodes are attacked/faulted, boundary constrained estimators and the comparisons method presented herein may result in a solution on or inside the dynamic decision boundary 720. Since not all sensors are attacked, desired changes requested for loads will be captured during the solution and hence the system will continue to function close to being normal.

Note that the dynamic decision boundary 850 is a smaller region as compared to the static decision boundary 820 since it is generated with various likely malicious attack, naturally occurring system fault or degradation and variety of normal operating scenarios. The dynamic decision boundary 850 is built with limited normal operational data without using such scenarios. Having two decision boundaries 820, 850 may help prevent the estimates from always selecting the best estimates to operate the system around the true reference signal.

Figure 9:
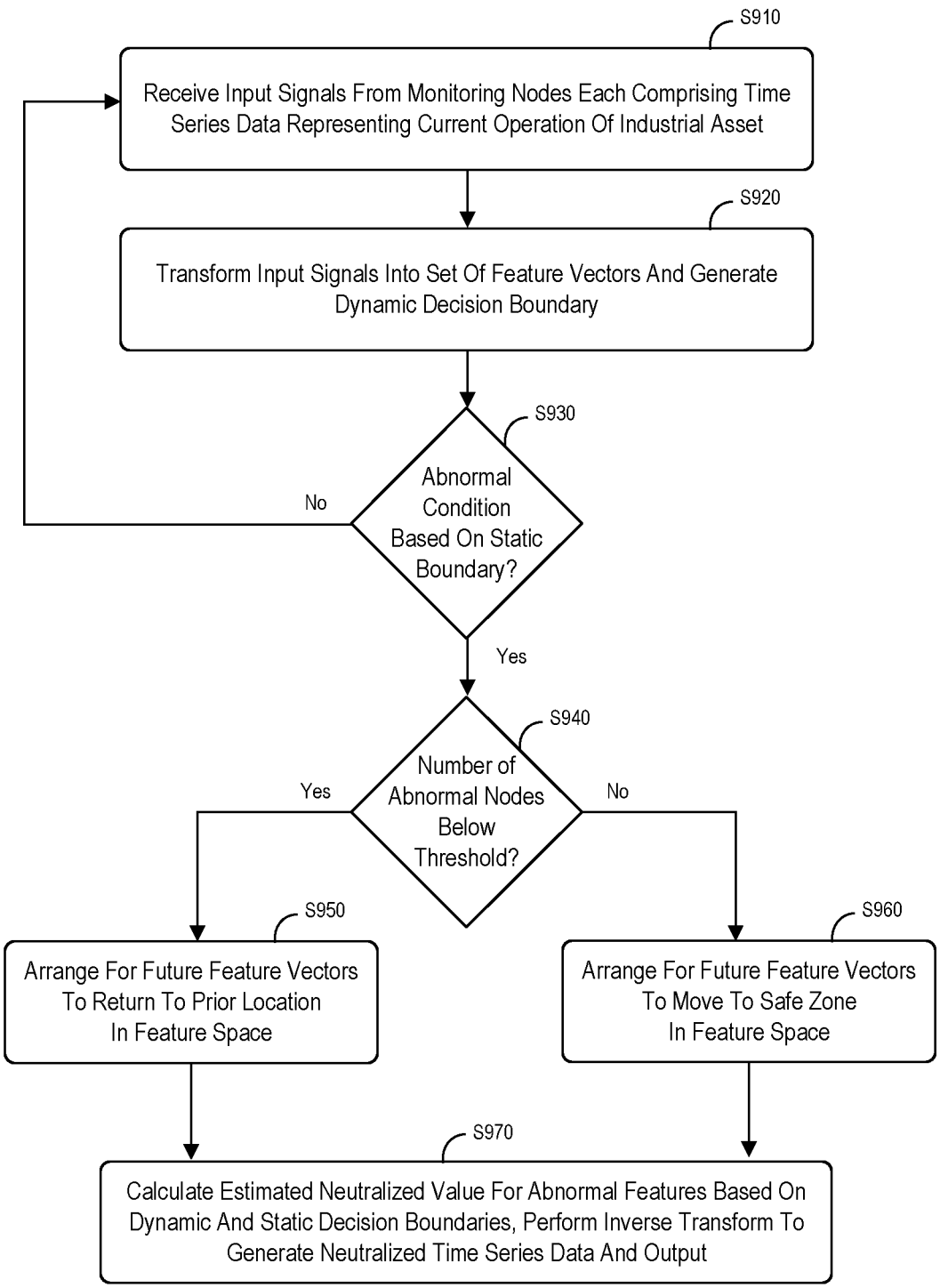
FIG. 9 is a neutralization method for an abnormal condition according to some embodiments.

FIG. 9 is a neutralization method for an abnormal condition according to some embodiments. At S910, a receiver may receive input signals from monitoring nodes (e.g., sensor nodes, actuator nodes, reference signal nodes, controller nodes, etc.) of an industrial asset, each input signal comprising time series data representing current operation of the industrial asset. The industrial asset might be associated with, for example, a turbine, a gas turbine, a wind turbine, an engine, a jet engine, a locomotive engine, a refinery, a power grid, a dam, an autonomous vehicle, etc.

At S920, a neutralization engine may transform the input signals into a set feature vectors in a feature space, each feature vector being associated with one of a plurality of overlapping batches of received input signals. The system may also automatically and dynamically generate a dynamic decision boundary based on the set of feature vectors.

If the system does not detect a current abnormal condition (e.g., a fault or attack) based on a static decision boundary at S930, the process continues at S910. According to some embodiments, the static decision boundary is constructed by a machine learning algorithm. For example, the machine learning algorithm may construct the static decision boundary offline based on data from a high-fidelity model of the industrial asset and simulated conditions including normal operation, attacked operation, and fault operation. Note that the machine learning algorithm might construct the static decision boundary based on a historic data set associated with the industrial asset and/or similar industrial assets. If the system detects an abnormal state of the industrial asset based on the set of feature vectors and a predetermined static decision boundary associated with the industrial asset at S930, it is determined if the number of abnormal nodes is below a threshold value at S940 (e.g., below a predetermined number of monitoring nodes, percentage of monitoring nodes, etc.).

If the number of abnormal nodes is below the threshold value at S940, the system will arrange for future feature vectors to return to a prior location (e.g., a location before the faults and/or attacks) within the static decision boundary at S950. If the number of abnormal nodes is not below the threshold value at S940, the system will arrange for future feature vectors to move to a safe zone in feature space (e.g., a location known to represent normal operation) at S960. Note that there may be a number of different safe zones (and the system may select an appropriate one) and/or a safe zone might even be outside the static decision boundary (e.g., representing an automatic shutdown operation)

The system may then calculate at S970 an estimated neutralized value for each abnormal feature value based on a dynamic decision boundary and the static decision boundary such that a future set of feature vectors will be moved with respect to the static decision boundary as determined at S950 or S960. Note that the dynamic decision boundary may be updated more frequently as compared to the static decision boundary. According to some embodiments, the dynamic decision boundary is a trained mathematical function that represents a shell enclosing recent feature vectors. For example, the dynamic decision boundary might be generated using a 1-class semi-supervised machine learning algorithm. The system may also perform an inverse transform of each estimated neutralized value to generate neutralized signals comprising time series data and output the neutralized signals.

Figure 10:
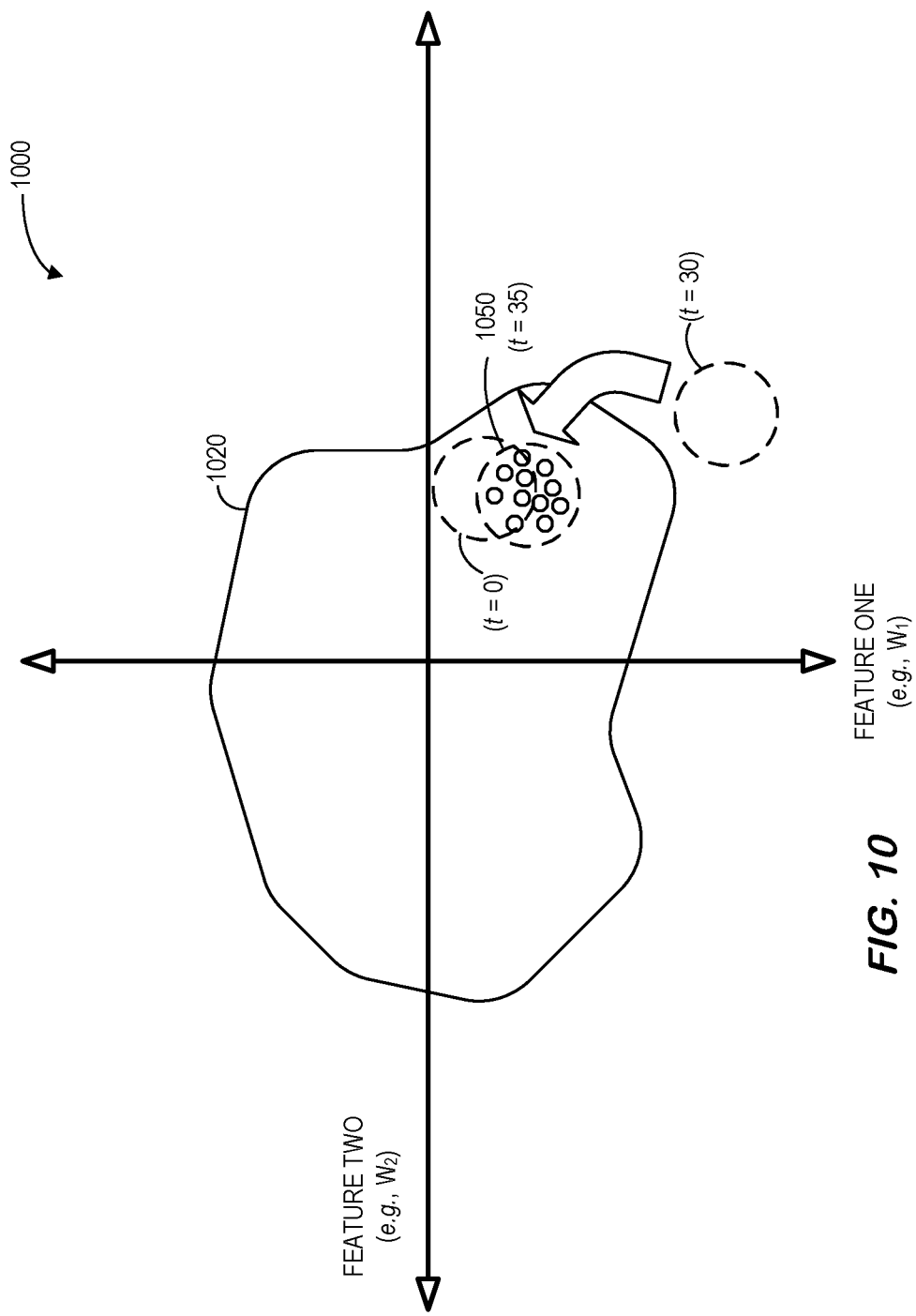
FIG. 10 is a conceptual view showing a region where a system may be driven to during dynamic concurrent learning in the presence of attack/fault when a number of abnormal monitoring nodes (e.g., being attacked) does not exceed a threshold value in accordance with some embodiments.

Consider again the example of FIG. 8 and assume that the number of abnormal nodes is below a threshold value (e.g., only one or a few monitoring nodes are being attacked). As a result, the system may arrange for future feature vectors to move toward a previous location of the dynamic decision boundary 850 within the static decision boundary 820 (e.g., a time t=0 when operation was known to be normal). FIG. 10 is a conceptual view 1000 showing a region where a system may be driven to during dynamic concurrent learning in the presence of attack/fault when a number of abnormal monitoring nodes (e.g., being attacked) does not exceed a threshold value in accordance with some embodiments. After the abnormal condition was detected at t=30, the system generated neutralized signals such that the dynamic decision boundary 1050 at t=35 has moved to a new location within the static decision boundary 1020 similar to the location that existed at t=0 (when operation of the industrial asset was known to be normal).

Figure 11:
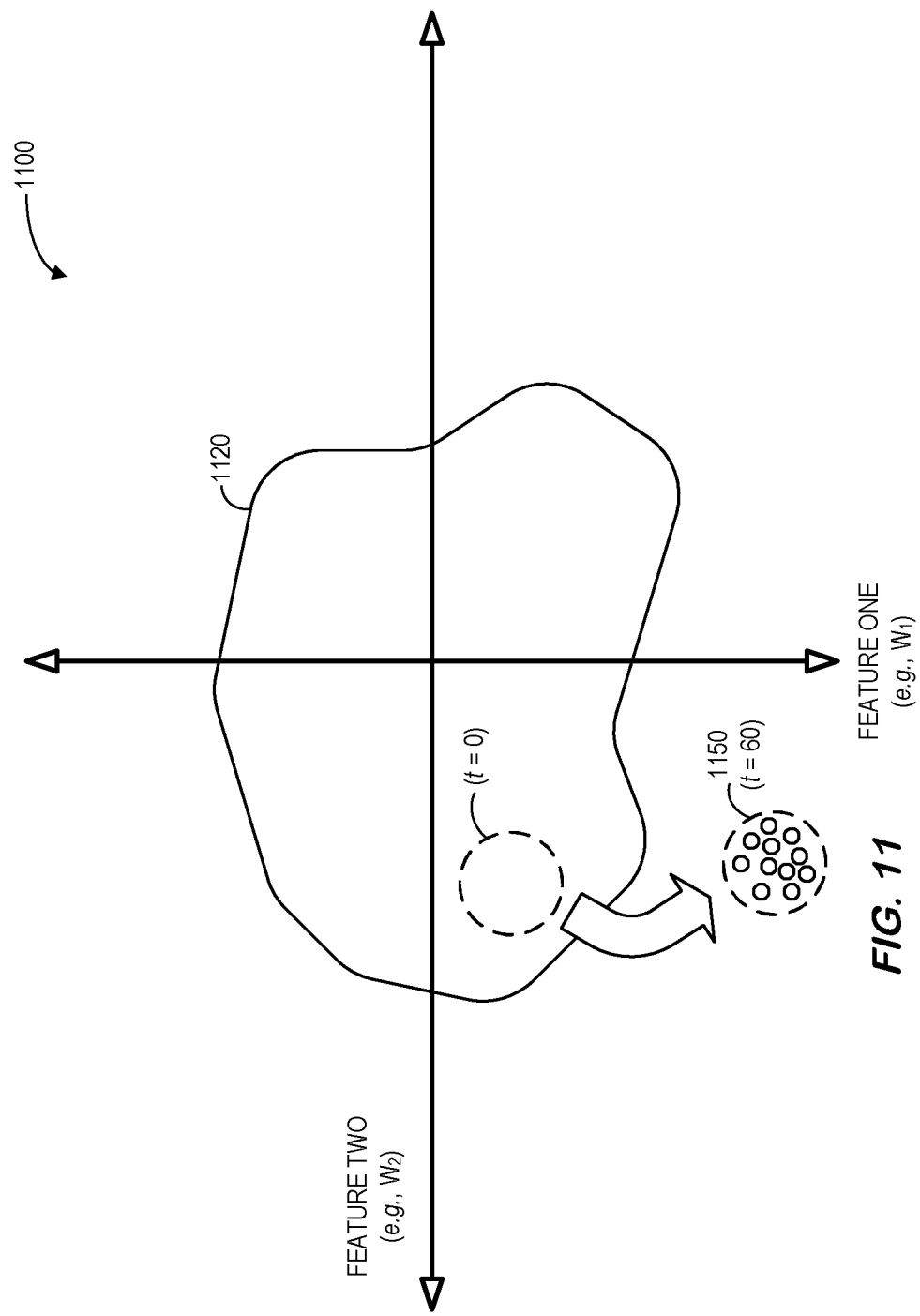
FIG. 11 is another example of an industrial asset having feature vectors moving outside a static decision boundary according to some embodiments.
Figure 12:
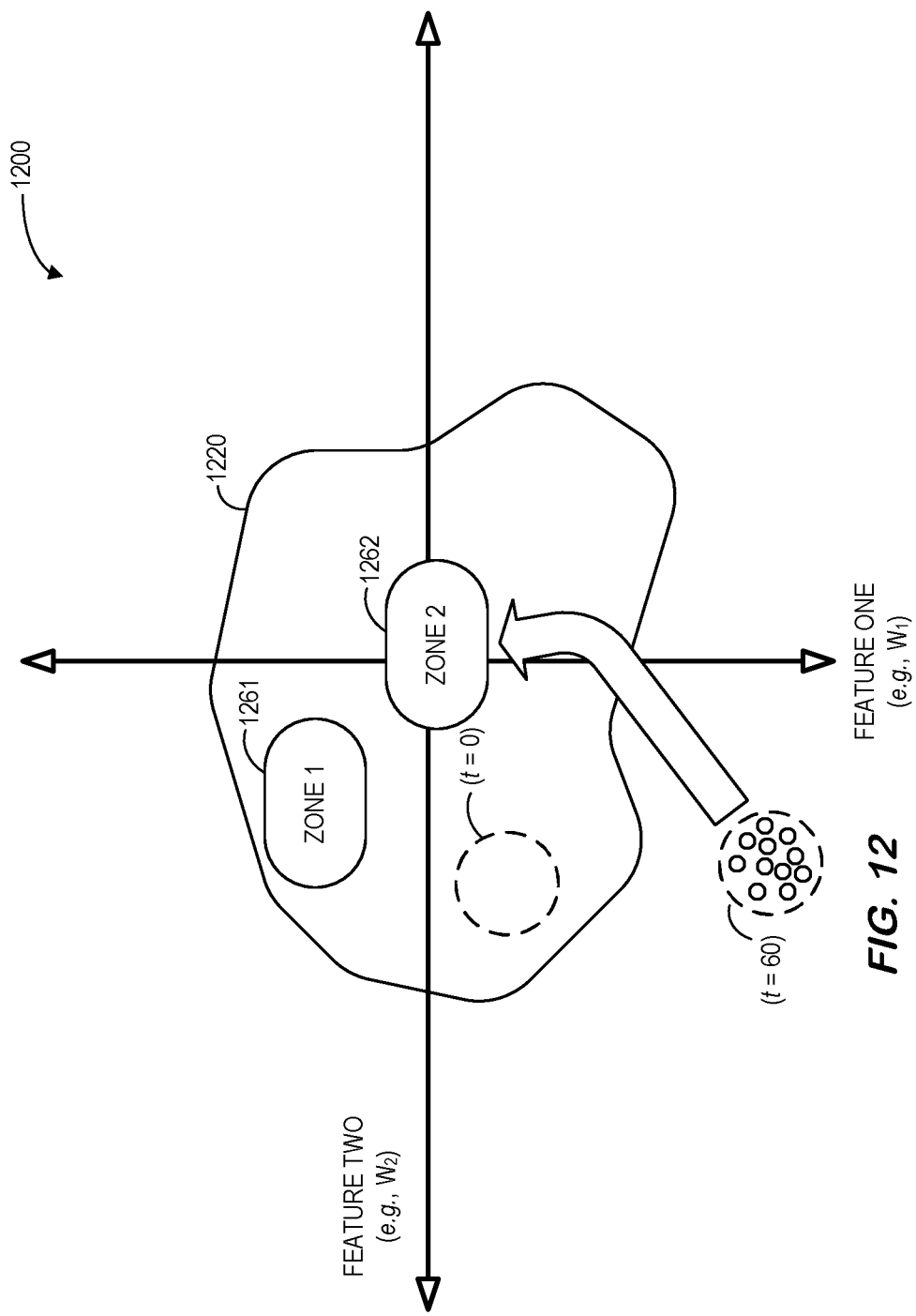
FIG. 12 illustrates neutralization when a number of monitoring nodes being attacked does exceed a threshold value in accordance with some embodiments.
Figure 13:
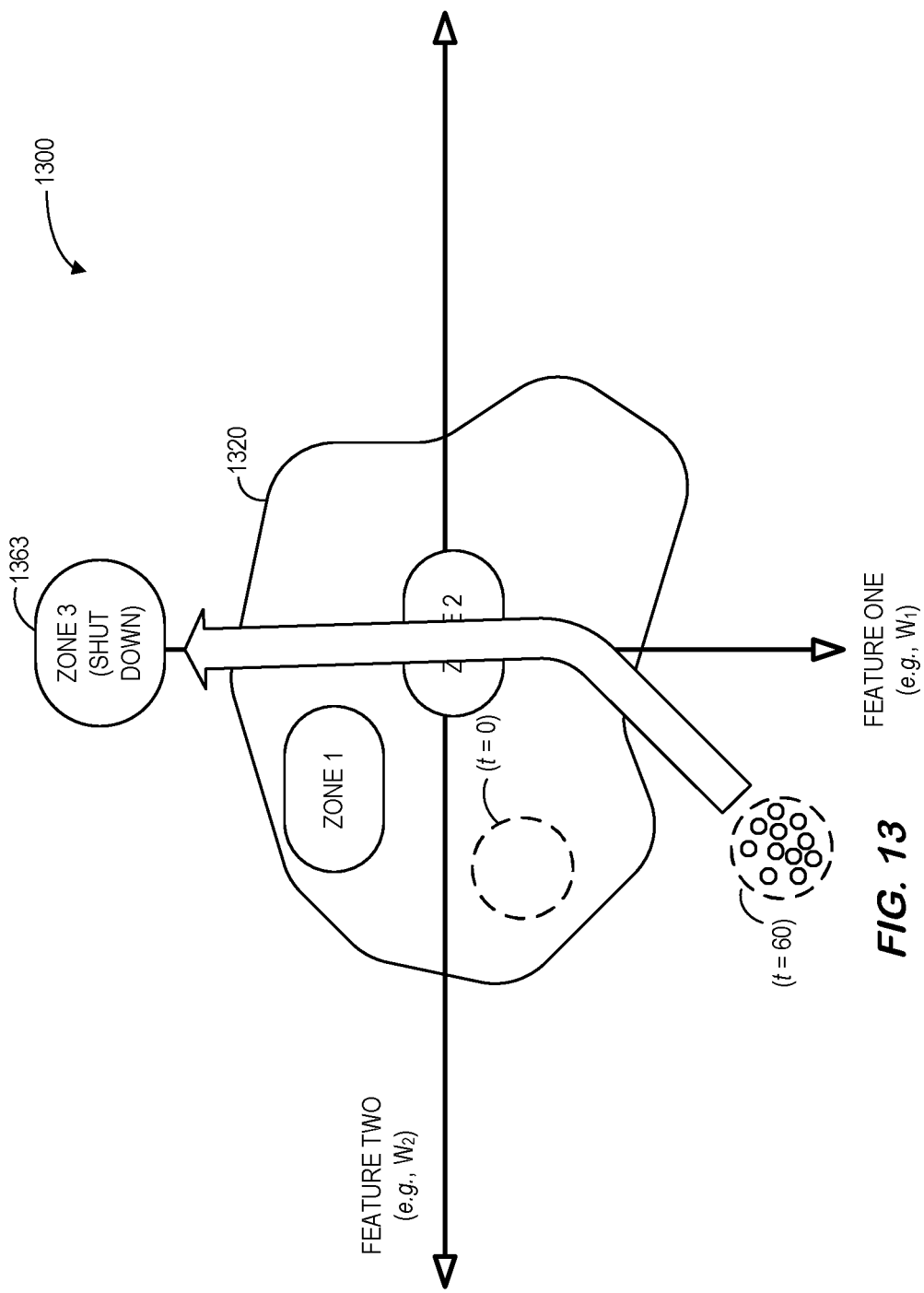
FIG. 13 is another example of neutralization when a number of monitoring nodes being attacked does exceed a threshold value according to some embodiments.

FIG. 11 is another example 1100 of an industrial asset having feature vectors moving outside a static decision boundary 1020 according to some embodiments. In particular, the dynamic decision boundary 1150 exhibited normal operation at t=0 but has drifted into abnormal operation at t=60. In this example, assume that the number of abnormal monitoring nodes exceeds the threshold value (e.g., all monitoring nodes might be attacked/faulted). In this scenario, instead of varying true or neutralized reference signal using other external factors, embodiments may define true or neutralized reference signals for one or more safe zones. FIG. 12 illustrates 1200 neutralization when a number of monitoring nodes being attacked does exceed a threshold value in accordance with some embodiments. In particular, zone 1 (1261) and zone 2 (1262) are defined within the static decision boundary 1220. Safe zones 1 and 2 might correspond to system operation inside the normal operating region defined by the static decision boundary 1220. Zone 1 might be driving the system to a base load condition while Zone 2 drives the system to a nearest load where the system was operating when the attack/fault was detected (as in the example of FIGS. 8 and 10). FIG. 13 is another example 1300 of neutralization when a number of monitoring nodes being attacked does exceed a threshold value according to some embodiments. Here, zone 3 (1363) has been added outside a static decision boundary 1320. The region represented by zone 3 could correspond to, for example, a system shutdown region. In this scenario, the system may recommend a safe zone to an operator to back track the attack/fault to its source (if the operator is in the loop for the whole or parts of the process). The operator might also manually override system-made recommendations. In addition, a safe zone could be preprogrammed inside the system for a specific operational mode. The choice of the safe zone can be automated, according to some embodiments, by selecting the safe zone with least impact on the system performance and the rate at which the system can reach the safe zone. Classical techniques in reachability analysis and machine learning might be leveraged when choosing the appropriate safe zone. A reachability analysis may be performed on the dynamic feature space model of the system as described herein. All other computational methods described to generate estimated time series signals could also be used. When comparing estimated time series signals, the system can recommend the best safe zone by choosing the one with minimum mean squared error with respect to the true reference signal.

Thus, embodiments may provide for concurrent use of dynamic and static decision boundaries during signal estimation. Such an approach may offer the ability to drive the system to safe operation while continuing to function—even when nearly all sensors are attacked. When all sensors are attacked, some embodiments may provide a generic framework to drive the system to one of the best safe zones by dynamically learning the state of the system. The framework may use external factors to continue to provide output. Moreover, embodiments may provide an ability to simultaneously process and analyze a substantial number of monitoring nodes (e.g., thousands of node) with heterogeneous sensing in real-time (making the system more sensitive). In addition, the dynamic and concurrent learning method may help nullify the effects of stealthy attacks/degraded sensors in the system and offer notification to the operator that such an attack/fault took place and was neutralized.

Figure 14:
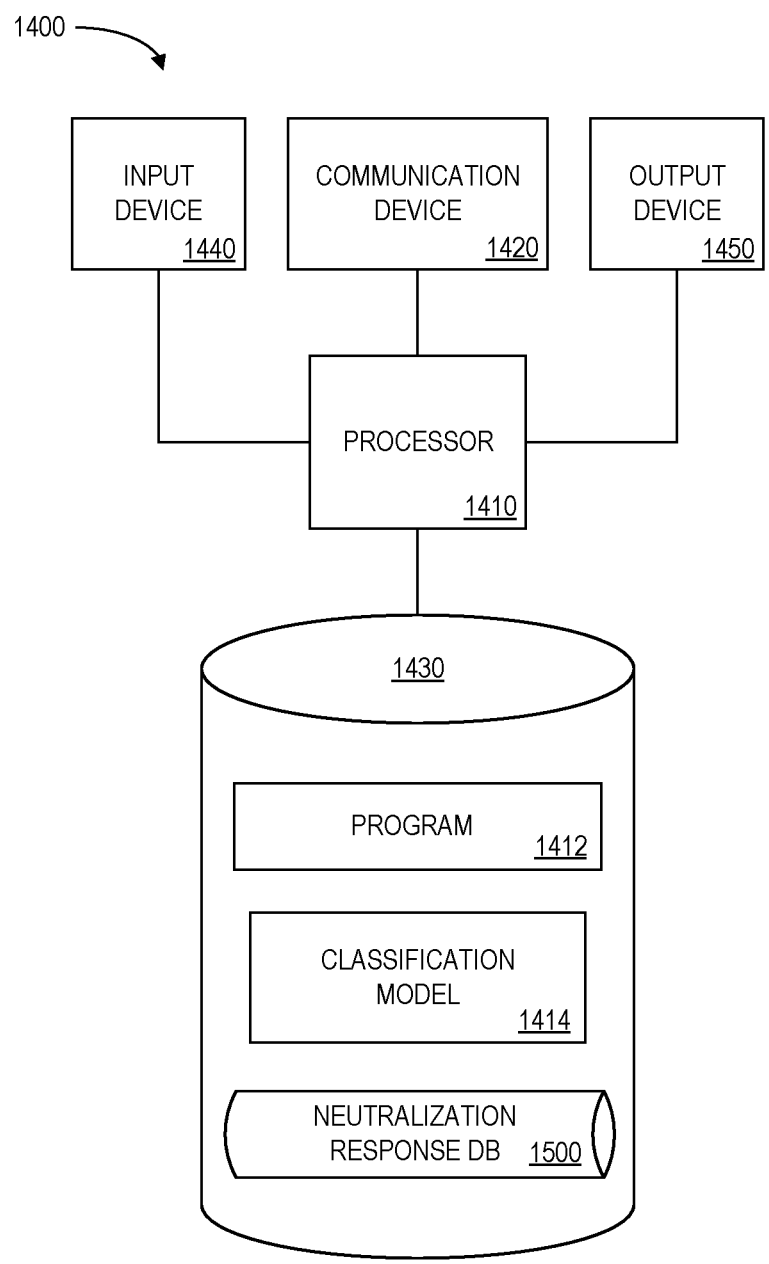
FIG. 14 illustrates a neutralization platform or apparatus in accordance with some embodiments.

The embodiments described herein may be implemented using any number of different hardware configurations. For example, FIG. 14 is a block diagram of an industrial asset protection platform 1400 that may be, for example, associated with any of the systems described herein. The industrial asset protection platform 1400 comprises a processor 1410, such as one or more commercially available Central Processing Units ("CPUs") in the form of one-chip microprocessors, coupled to a communication device 1460 configured to communicate via a communication network (not shown in FIG. 14). The communication device 1460 may be used to communicate, for example, with one or more remote monitoring nodes, user platforms, digital twins, etc. The industrial asset protection platform 1400 further includes an input device 1440 (e.g., a computer mouse and/or keyboard to input adaptive and/or predictive modeling information) and/an output device 1450 (e.g., a computer monitor to render a display, provide alerts, transmit recommendations, and/or create reports). According to some embodiments, a mobile device, monitoring physical system, and/or PC may be used to exchange information with the industrial asset protection platform 1400.

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1412 and/or a classification model 1414 for controlling the processor 1410. The processor 1410 performs instructions of the programs 1412, 1414, and thereby operates in accordance with any of the embodiments described herein. For example, the processor 1410 may receive input signals from monitoring nodes of an industrial asset, each input signal comprising time series data representing current operation. The processor 1410 may transform the input signals into feature vectors in feature space, each feature vector being associated with one of a plurality of overlapping batches of received input signals. A dynamic decision boundary may be generated based on the set of feature vectors, and an abnormal state of the asset may be detected based on the set of feature vectors and a predetermined static decision boundary. An estimated neutralized value for each abnormal feature value may be calculated based on the dynamic decision boundary and the static decision boundary such that a future set of feature vectors is moved with respect to the static decision boundary. An inverse transform of each estimated true value may be performed by the processor 1410 to generate neutralized signals comprising time series data that are output.

The programs 1412, 1414 may be stored in a compressed, uncompiled and/or encrypted format. The programs 1412, 1414 may furthermore include other program elements, such as an operating system, clipboard application, a database management system, and/or device drivers used by the processor 1410 to interface with peripheral devices.

As used herein, information may be "received" by or "transmitted" to, for example: (i) the industrial asset protection platform 1400 from another device; or (ii) a software application or module within the industrial asset protection platform 1400 from another software application, module, or any other source.

In some embodiments (such as the one shown in FIG. 14), the storage device 1430 further stores neutralization response database 1500. An example of a database that may be used in connection with the industrial asset protection platform 1400 will now be described in detail with respect to FIG. 15. Note that the database described herein is only one example, and additional and/or different information may be stored therein. Moreover, various databases might be split or combined in accordance with any of the embodiments described herein.

Figure 15:
FIG. 15 is a tabular portion of a neutralization response database according to some embodiments.

Referring to FIG. 15, a table is shown that represents the neutralization response database 1500 that may be stored at the industrial asset protection platform 1400 according to some embodiments. The table may include, for example, entries identifying system responses to attacks and/or faults. The table may also define fields 1502, 1504, 1506, 1508, 1510 for each of the entries. The fields 1502, 1504, 1506, 1508, 1510 may, according to some embodiments, specify: an abnormality identifier 1502, a date and time 1504, abnormality details 1506, a neutralization response 1508, and a status 1510. The neutralization response database 1500 may be created and updated, for example, when a threat or fault is detected in connection with monitoring nodes of an industrial asset.

The abnormality identifier 1502 may be, for example, a unique alphanumeric code identifying a threat or fault that was detect at the associated date and time 1504. The abnormality details 1506 may describe the detected abnormality. The details 1506 might indicate, for example, which monitoring nodes are being attacked or experiencing a fault, how many nodes are likely under attack, etc. The neutralization response 1508 may indicate how the system recommends (or has decided) to counter the abnormality. The response 1508 might indicate, for example, that the neutralization signals will move (or has moved) the dynamic decision boundary to a prior location, to a safe zone, to a shutdown operation, etc. in accordance with any of the embodiments described herein. The status 1510 may indicate, for example, that a threat or fault has already been neutralized or that a response is still in process.

Figure 16:
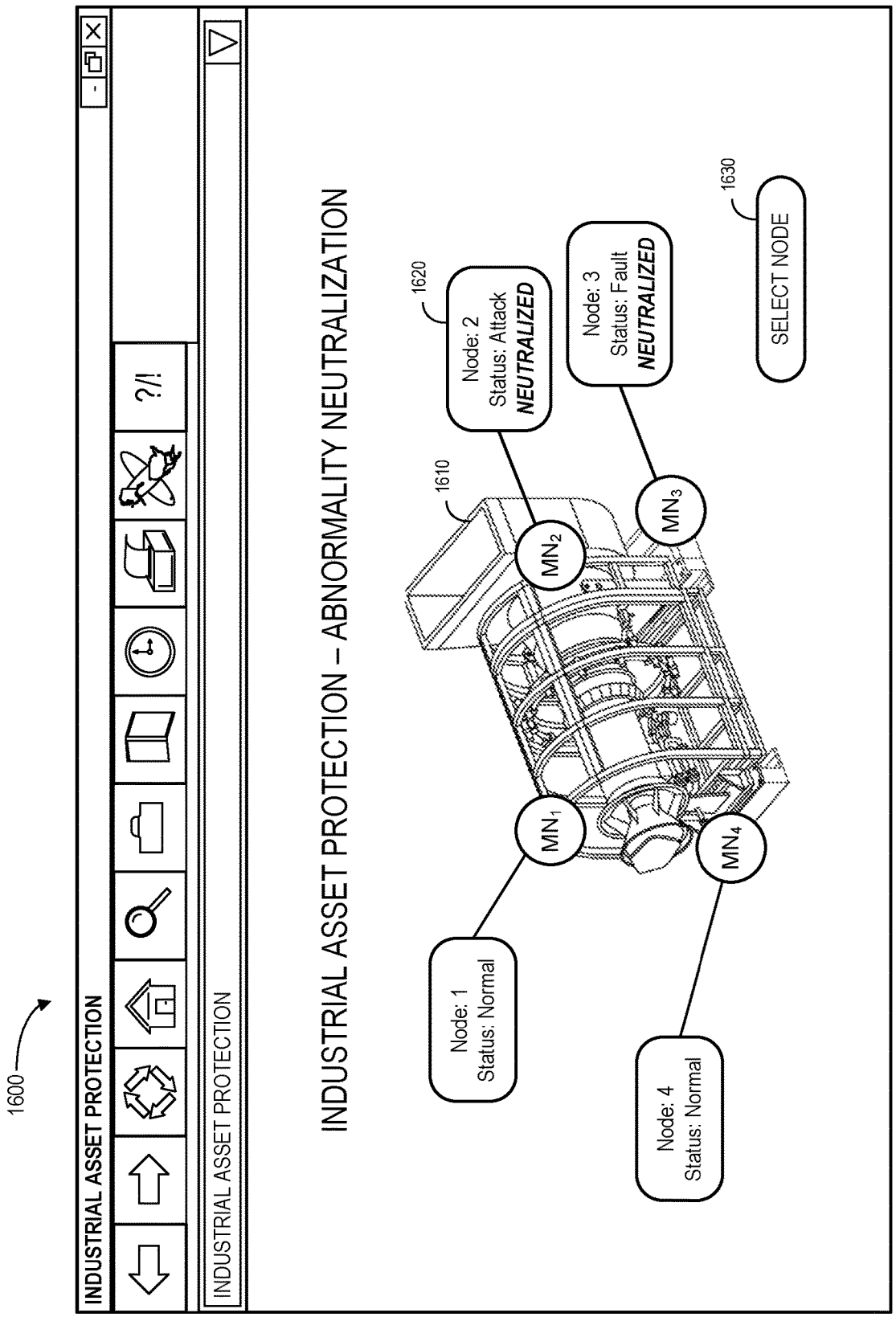
FIG. 16 illustrates a display that might be provided for an industrial asset abnormality neutralization system in accordance with some embodiments.

FIG. 16 is abnormality neutralization display 1600 in accordance with some embodiments. The display 1600 includes information about an industrial asset 1610 having a number of monitoring nodes ($MN_1$ through $MN_4$). In particular, the display 1600 includes, for each node, an indication of a current status 1620, including fault and attacks states as determined by any of the embodiment described herein along with indications of whether or not those abnormalities have been neutralized. According to some embodiments, the display 1600 is interactive and may be used by an operator to determine more detailed information (e.g., via selection of an icon 1630) and/or to adjust or override the operation of the industrial asset.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on specific types of industrial assets (e.g., gas turbines), any of the embodiments described herein could be applied to other types of assets, such as dams, the power grid, military devices, etc.

The present invention has been described in terms of several embodiments solely for the purpose of illustration. Persons skilled in the art will recognize from this description that the invention is not limited to the embodiments described, but may be practiced with modifications and alterations.

The invention claimed is:

1. A system with dynamic concurrent learning mechanism to protect an industrial asset, comprising:
   a receiver configured to receive input signals from monitoring nodes of the industrial asset, each input signal comprising continuous time series of data representing a current operation of the industrial asset;
   a neutralization engine having a hardware processor configured to:
   transform the input signals into a set feature vectors in a feature dimensional space, each feature vector being associated with one of a plurality of successive overlapping batches of received input signals, wherein the overlapping is created with, at least, new data being added to a leading edge of a batch,
   detect an abnormal state of the industrial asset based on the set of transformed feature vectors and a predetermined static decision boundary, that separates a normal behavior and abnormal behavior, associated with the industrial asset,
   automatically and dynamically generate a dynamic decision boundary based on the set of transformed feature vectors, wherein the dynamic decision boundary is updated more frequently than the static decision boundary during a normal operation and is used concurrently with the static decision boundary to cover more restricted normal operating space,
   calculate an estimated neutralized value for each abnormal feature value based on the dynamic decision boundary and the static decision boundary to arrange and move a future set of feature vectors with respect to the static decision boundary to either a prior location or a safe zone in the feature dimensional space, and
   perform an inverse transform of each estimated neutralized value to generate neutralized signals comprising the transformed time series of data; and
   an output configured to output the neutralized signals.

2. The system of claim 1, wherein the neutralization engine is further to:
   determine that a number of monitoring nodes currently being attacked does not exceed a threshold value, and
   responsive to the determination, arrange for the future set of feature vectors to move in the feature space toward a previous location of the dynamic decision boundary within the static decision boundary.

3. The system of claim 1, wherein neutralization engine is further to:
   determine that a number of monitoring nodes currently being attacked exceeds a threshold value, and
   responsive to the determination, arrange for the future set of feature vectors to move toward a predetermined location in the feature space.

4. The system of claim 3, wherein the predetermined location is within the static decision boundary.

5. The system of claim 4, wherein the predetermined location is associated with one of a set of predetermined zones within the static decision boundary, and the neutralization engine is further to:
   select one of the predetermined zones as an appropriate predetermined location.

6. The system of claim 3, wherein the predetermined location is outside the static decision boundary and represents a shutdown of the industrial asset.

7. The system of claim 1, wherein the monitoring nodes are associated with at least one of: (i) sensor nodes, (ii) actuator nodes, (iii) reference signal nodes, and (iv) controller nodes.

8. The system of claim 1, wherein the dynamic decision boundary is updated more frequently as compared to the static decision boundary.

9. The system of claim 1, wherein the static decision boundary is constructed by a machine learning algorithm.

10. The system of claim 9, wherein the machine learning algorithm constructs the static decision boundary offline based on data from a high-fidelity model of the industrial asset and simulated conditions including normal operation, attacked operation, and fault operation.

11. The system of claim 9, wherein the machine learning algorithm constructs the static decision boundary based on a historic data set associated with at least one of: (i) the industrial asset, and (ii) similar industrial assets.

12. The system of claim 1, wherein the dynamic decision boundary is a trained mathematical function that represents a shell enclosing recent feature vectors.

13. The system of claim 12, wherein the dynamic decision boundary is generated using a 1-class semi-supervised machine learning algorithm.

14. The system of claim 1, wherein the industrial asset is associated with at least one of: (i) a turbine, (ii) a gas turbine, (iii) a wind turbine, (iv) an engine, (v) a jet engine, (vi) a locomotive engine, (vii) a refinery, (viii) a power grid, (ix) a dam, and (x) an autonomous vehicle.

15. A computerized method of dynamic concurrent learning techniques to protect an industrial asset, comprising:
   receiving input signals from monitoring nodes of the industrial asset, each input signal comprising continuous time series of data representing a current operation of the industrial asset;
   transforming, by a neutralization engine computer hardware processor, the input signals into a set feature vectors in a feature dimensional space, each feature vector being associated with one of a plurality of successive overlapping batches of received input signals, wherein the overlapping is created with, at least, new data being added to a leading edge of a batch;

detecting an abnormal state of the industrial asset based on the set of transformed feature vectors and a predetermined static decision boundary, that separates a normal behavior and abnormal behavior, associated with the industrial asset, automatically and dynamically generating a dynamic decision boundary based on the set of transformed feature vectors, wherein the dynamic decision boundary is updated more frequently than the static decision boundary during a normal operation and is used concurrently with the static decision boundary to cover more restricted normal operating space, calculating an estimated neutralized value for each abnormal feature value based on the dynamic decision boundary and the static decision boundary to arrange and move a future set of feature vectors with respect to the static decision boundary to either a prior location or a safe zone in the feature dimensional space;

performing an inverse transform of each estimated neutralized value to generate neutralized signals comprising the transformed time series of data; and outputting the neutralized signals.

16. The method of claim 15, further comprising:

determining that a number of monitoring nodes currently being attacked does not exceed a threshold value; and responsive to the determination, arranging for the future set of feature vectors to move in the feature space toward a previous location of the dynamic decision boundary within the static decision boundary.

17. The method of claim 15, further comprising:

determining that a number of monitoring nodes currently being attacked exceeds a threshold value; and responsive to the determination, arranging for the future set of feature vectors to move toward a predetermined location in the feature space.

18. The method of claim 17, wherein the predetermined location is associated with one of a set of predetermined zones within the static decision boundary, and further comprising:

selecting one of the predetermined zones as an appropriate predetermined location.

19. A non-transitory, computer-readable storage medium storing instructions that, when executed by a computer hardware processor, cause the computer hardware processor to perform a method of dynamic concurrent learning techniques to protect an industrial asset, the method comprising:

receiving input signals from monitoring nodes of the industrial asset, each input signal comprising continuous time series of data representing a current operation of the industrial asset;

transforming, by a neutralization engine computer hardware processor, the input signals into a set feature vectors in a feature dimensional space, each feature vector being associated with one of a plurality of successive overlapping batches of received input signals, wherein the overlapping is created with, at least, new data being added to a leading edge of a batch;

detecting an abnormal state of the industrial asset based on the set of transformed feature vectors and a predetermined static decision boundary, that separates a normal behavior and abnormal behavior, associated with the industrial asset, automatically and dynamically generating a dynamic decision boundary based on the set of transformed feature vectors, wherein the dynamic decision boundary is updated more frequently than the static decision boundary during a normal operation and is used concurrently with the static decision boundary to cover more restricted normal operating space, calculating an estimated neutralized value for each abnormal feature value based on the dynamic decision boundary and the static decision boundary to arrange and move a future set of feature vectors with respect to the static decision boundary to either a prior location or a safe zone in the feature dimensional space;

performing an inverse transform of each estimated neutralized value to generate neutralized signals comprising the transformed time series of data; and outputting the neutralized signals.

20. The medium of claim 19, further comprising:

comparing a number of monitoring nodes currently being attacked with a threshold value; and if the number of monitoring nodes currently being attacked does not exceed the threshold value, arranging for the future set of feature vectors to move in the feature space toward a previous location of the dynamic decision boundary within the static decision boundary; and if the number of monitoring nodes currently being attacked does exceed the threshold value, arranging for the future set of feature vectors to move toward a predetermined location in the feature space.

* * * * *